US008661405B2

(12) United States Patent  (10) Patent No.: US 8,661,405 B2
Stevenson et al.  (45) Date of Patent: Feb. 25, 2014

(54) PATTERN IMPLEMENTATION TECHNIQUE

(75) Inventors: David R. Stevenson, Portland, OR (US); James R. Abbott, Bothell, WA (US); Jeffrey M. Fischer, Portland, OR (US); Scott E. Schneider, Raleigh, NC (US); Brian K. Roberts, Hillsboro, OR (US); Martha C. Andrews, Portland, OR (US); David J. Ruest, Ottawa (CA); Shawn K. Gardner, Kanata (CA); Christopher D. Maguire, Portland, OR (US); Eric O. Funk, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/223,842

(22) Filed: Sep. 1, 2011

(65) Prior Publication Data

US 2012/0023477 A1  Jan. 26, 2012

Related U.S. Application Data

(63) Continuation of application No. 11/196,895, filed on Aug. 4, 2005, now Pat. No. 8,056,048.

(51) Int. Cl.
*G06F 9/44* (2006.01)
(52) U.S. Cl.
USPC ......................................... 717/105; 717/109
(58) Field of Classification Search
USPC .................................. 717/105, 109
See application file for complete search history.

(56) References Cited

U.S. PATENT DOCUMENTS

| 5,715,415 | A | * | 2/1998 | Dazey et al. | 715/708 |
|---|---|---|---|---|---|
| 6,125,385 | A | * | 9/2000 | Wies et al. | 709/203 |
| 6,523,171 | B1 | | 2/2003 | Dupuy et al. | |
| 6,651,240 | B1 | | 11/2003 | Yamamoto et al. | |
| 6,671,818 | B1 | | 12/2003 | Mikurak | |
| 6,851,105 | B1 | * | 2/2005 | Coad et al. | 717/106 |
| 2003/0132967 | A1 | | 7/2003 | Gangadharan | |

OTHER PUBLICATIONS

Steven Franklin, "Customizing and Automating Rational XDE Developer—Java Platform Edition", Feb. 5, 2004, pp. 1-20.*
"One-step Trace Preprocessor for C and C++ Programs", IBM Research Disclosure, Apr. 2001, p. 660.
Deng-Jyi Chen et al., "Mining Control Patterns From Java Program Corpora", Journal of Information Science and Engineering 20, 2004, pp. 57-83.
Jan Hannemann et al., "Design Pattern Implementation in Java and AspectJ", OOPSLA '02, 2002, pp. 161-173.
Yvonne Coady et al., "Using AspectC to Improve the Modularity of Path-Specific Customization in Operating System Code", ESEC/FSE, 2001, pp. 88-98.
Uri Dekel et al., "Towards a Standard Family of Languages for Matching Patterns in Source Code", Proceedings of the IEEE International Conference on Software—Science, Technology & Engineering, 2003, pp. 1-10.

(Continued)

*Primary Examiner* — Wei Zhen
*Assistant Examiner* — Lanny Ung
(74) *Attorney, Agent, or Firm* — Walter W. Duft

(57) ABSTRACT

A pattern implementation technique in which a pattern is defined as a software artifact that comprises a pattern signature representing one or more parameters of the pattern and a pattern implementation model representing one or more methods for expanding the pattern in a selected software context by assigning one or more arguments to the one or more parameters.

21 Claims, 30 Drawing Sheets

(56) References Cited

OTHER PUBLICATIONS

Sandro Schwedler, "Rapid Portlet Design with Rational XDE Patterns, WebSphere Studio and the IBM Portal Toolkit", IBM WebSphere Developer Technical Journal (www-128.ibm.com/developerworks/websphere/techjournal/0308_schwedler/schwedler.html), 2003, pp. 1-20.

Thierry Matusiak et al., "Model-Driven Development Using XDE Patterns", (www-128.ibm.com/developerworks/rational/library/5567.html),2004, pp. 1-33.

Steven Franklin, "Customizing and Automating Rational XDE Developer—Java Platform Edition", (www-128.ibm.com/developerworks/rational/library/3011.html), 2004, pp. 1-20.

Brad Appleton, "Patterns and Software: Essential Concepts and Terminology", Feb. 14, 2000, http://www.cmcrossroads.com/bradapp/docs/patterns-intro.html.

Mohamed Fayad et al., "Object-Oriented Application Frameworks", Oct. 1997, Special Issue on Object-Oriented Application Frameworks, vol. 40, No. 10.

Ralph E. Johnson,"Frameworks = (Components + Patterns)", Oct. 1997, ACM, vol. 40, No. 10.

Somsak Phattarasukol et al., "Design Pattern Integrated Tool", Oct. 2004, ACM.

* cited by examiner

```
public abstract class ProductA {
...
} // class ProductA
public abstract class ProductB {
...
} // class ProductB
```

*FIG. 2A*

```
public abstract class AbstractFactory {
  private static final Factory1 factory1 = new Factory1();
  private static final Factory2 factory2 = new Factory2();
}
...
/*
* Returns a concrete factory object that is an instance of the concrete factory class
* appropriate for a given factory type.
*/
  static final AbstractFactory GetFactory(int factorytype) {
    switch (factorytype) {
      case Factory1:
        &nbs
p; return Factory1;
      case Factory2;
        &nbs
p; return Factory2;
...
    } // switch
    String errMsg = Integer.toString(factorytype);
      throw new IllegalArgumentException(errMsg);
  } //GetFactory
  public abstract ProductA CreateProductA();
  public abstract ProductB CreateProductB();
} // AbstractFactory
```

*FIG. 2B*

```
class ConcreteFactory1 extends AbstractFactory {
  public ProductA createProductA() {
    return new ProductA1();
  } // create ProductA
  public ProductB createProductB() {
    return new ProductB1();
  } // create ProductB class ConcreteFactory2 extends AbstractFactory {
  public ProductA createProductA() {
    return new ProductA2();
  } // create ProductA
  public ProductB createProductB() {
    return new ProductB2();
  } // create ProductB
```

*FIG. 2C*

```
public class Client {
  public void doit() {
    AbstractFactory absfact1;
absfact1 = AbstractFactory.GetFactory(AbstractFactory.Factory1);
    ProductA productA1 = absfact1.CreateProductA();
    ProductB productB1 = absfact1.CreateProductB()
AbstractFactory absfact1;
absfact2 = AbstractFactory.GetFactory(AbstractFactory.Factory2);
    ProductA productA2 = absfact2.CreateProductA();
    ProductB productB2 = absfact2.CreateProductB();
  } // doit
} // Client
```

*FIG. 2D*

```
package myPatterns.patterns;

import com.xxx.xtools.patterns.framework.AbstractPatternLibrary;
import com.xxx.xtools.patterns.framework.PatternIdentity;
import com.xxx.xtools.patterns.framework.uml2.AbstractPatternDefinition;
import com.xxx.xtools.patterns.framework.uml2.AbstractPatternInstance;

import com.xxx.xtools.patterns.framework.PatternParameterIdentity;
import com.xxx.xtools.patterns.framework.uml2.AbstractPatternParameter;
import com.xxx.xtools.patterns.framework.AbstractPatternDependency;
import com.xxx.xtools.patterns.framework.PatternParameterValue;
import org.eclipse.uml2.*;

public class InterfacePattern extends AbstractPatternDefinition { private final static String PATTERN_ID =
"myPatterns.patterns.InterfacePattern";

private final static String PATTERN_VER = "1.0.0";

private final InterfaceParameter interfaceParameter = new
InterfaceParameter();

private final ImplementationParameter implementationParameter =
new ImplementationParameter(this.interfaceParameter);

public InterfacePattern(AbstractPatternLibrary
owningPatternLibrary) {
                        super(new PatternIdentity(owningPatternLibrary,
PATTERN_ID,

PATTERN_VER));
            }
```

*FIG. 7B*

```
            private class InterfaceParameter extends
AbstractPatternParameter { private final static String PARAMETER_ID =
"InterfaceParameter";

InterfaceParameter() { super(InterfacePattern.this, new PatternParameterIdentity(

PARAMETER_ID));
                            } public boolean expand(PatternParameterValue
value) {
                //TODO : implement the parameter's expand method
                        return true;
                        } public boolean
expand(PatternParameterValue.Removed value) {
                //TODO : implement the parameter's expand method
                        return true;
                        }

```
            private class ImplementationParameter extends
AbstractPatternParameter { private final static String PARAMETER_ID =
"ImplementationParameter";

ImplementationParameter(InterfaceParameter
interfaceParameter) {
                        super(InterfacePattern.this, new
PatternParameterIdentity(

PARAMETER_ID));

new ImplementationParameter_InterfaceParameterDependency(
interfaceParameter);
                        } public boolean expand(PatternParameterValue value) {
        //TODO : implement the parameter's expand method
                    return true;
                    } public boolean expand(PatternParameterValue.Removed value)
{
        //TODO : implement the parameter's expand method
                    return true;
                    }
```

FIG. 7D

```
            private class
ImplementationParameter_InterfaceParameterDependency extends
AbstractPatternDependency { private ImplementationParameter_InterfaceParameterDependency(
AbstractPatternParameter dependency) {
super(ImplementationParameter.this, dependency);
                                }
        public boolean update(PatternParameterValue value,
PatternParameterValue dependencyValue) {
        //TODO : implement the dependency's update method
                    return true;
                                } public boolean update(PatternParameterValue.Maintained value,
PatternParameterValue.Removed dependencyValue) {
        //TODO : implement the dependency's update method
                    return true;
                                } public boolean update(PatternParameterValue.Removed value,
PatternParameterValue.Maintained dependencyValue) {
        //TODO : implement the dependeny's update method
                    return true;
                                }
                            }

```
        private class InterfaceParameter extends
AbstractPatternParameter { private final static String PARAMETER_ID =
"InterfaceParameter";

InterfaceParameter() { super(InterfacePattern.this, new PatternParameterIdentity(

PARAMETER_ID));
                    } public boolean expand(PatternParameterValue value)
{
        System.out.println("InterfaceParameter.expand");
                    return true;
                    } public boolean
expand(PatternParameterValue.Removed value) {
            System.out.println("InterfaceParameter.expand
removed");
                    return true;
                    }

```
        private class ImplementationParameter extends
AbstractPatternParameter { private final static String PARAMETER_ID =
"ImplementationParameter";

ImplementationParameter(InterfaceParameter
interfaceParameter) {
                super(InterfacePattern.this, new
PatternParameterIdentity(

PARAMETER_ID));

new ImplementationParameter_InterfaceParameterDependency( interfaceParameter);
                } public boolean expand(PatternParameterValue value) {
          System.out.println("ImplementationParameter.expand");
                return true;
                } public boolean expand(PatternParameterValue.Removed value)
{
          System.out.println("ImplementationParameter.expand
removed");
                return true;
                }
```

*FIG. 7G*

```
            private class
ImplementationParameter_InterfaceParameterDependency extends
AbstractPatternDependency { private ImplementationParameter_InterfaceParameterDependency(
AbstractPatternParameter dependency) {
super(ImplementationParameter.this, dependency);
                                        }
        public boolean update(PatternParameterValue value,
PatternParameterValue dependencyValue) {

System.out.println("ImplementationParameter_InterfaceParameterDependency.
update");
                        return true;
                                        } public boolean update(PatternParameterValue.Maintained value,
PatternParameterValue.Removed dependencyValue) {

System.out.println("ImplementationParameter_InterfaceParameterDependency.
update maintained removed");
                        return true;
                                        } public boolean update(PatternParameterValue.Removed value,
PatternParameterValue.Maintained dependencyValue) {

System.out.println("ImplementationParameter_InterfaceParameterDependency.
update removed maintained");
                        return true;
                                        }
                                }

```
               private class
ImplementationParameter_InterfaceParameterDependency extends
AbstractPatternDependency { private ImplementationParameter_InterfaceParameterDependency(
AbstractPatternParameter dependency) {
super(ImplementationParameter.this, dependency);
                           }
          public boolean update(PatternParameterValue value,
PatternParameterValue dependencyValue) {

System.out.println("ImplementationParameter_InterfaceParameterDependency.
update");

org.eclipse.uml2.Class implementationValue = (org.eclipse.uml2.Class)
value.getValue();

org.eclipse.uml2.Interface interfaceValue = (org.eclipse.uml2.Interface)
dependencyValue.getValue();

org.eclipse.uml2.Implementation implementationRelationship =
implemenationValue.createImplementation(org.eclipse.uml2.UML2Package.eINS
TANCE.getimplementation());

implementationRelationship.setImplementingClassifier
(implementationValue);

implementationRelationship.setContract(interfaceValue);

implementationRelationship.setRealizingclassifier(interfaceValue);

implementationRelationship.createMapping(org.eclipse.uml2.UML2Package.eIN
STANCE.getOpaqueExpression());

return true;
                              } public boolean update(PatternParameterValue.Maintained value,
PatternParameterValue.Removed dependencyValue) {

System.out.println("ImplementationParameter_InterfaceParameterDependency.
update maintained removed");
                      return true;
                              } public boolean update(PatternParameterValue.Removed value,
PatternParameterValue.Maintained dependencyValue) {

System.out.println("ImplementationParameter_InterfaceParameterDependency.
update removed maintained");
                      return true;
                              }
                     }

PATTERN IMPLEMENTATION TECHNIQUE

This application is a continuation under 35 U.S.C. 120 of application Ser. No. 11/196,895, filed Aug. 4, 2005, entitled "Pattern Implementation Technique."

BACKGROUND OF THE INVENTION

1. Field of the Invention

The present invention relates to computer software systems. More particularly, the invention concerns techniques for defining and applying patterns to or within a software system to cause the system to be structured or behave in a manner dictated by or consistent with the patterns.

2. Description of the Prior Art

In the field of design, a pattern represents an abstract solution that can be brought to bear on a recurring design problem. In formal terms, a pattern can be said to represent a common solution to a common problem in a given context. In the context of software development, patterns are used extensively to solve small and large-scale problems in the design, modeling, implementation, deployment, and maintenance of software systems. The application of a pattern to or within a software system causes the system to be structured and to behave in certain ways dictated by or consistent with the pattern. The application of a pattern generally occurs by acting upon software artifacts, such as object-oriented classes, through one or more explicit or implicit meta-models that describe the artifacts and allow their manipulation. Each pattern represents a form of reusable asset that encapsulates the relationship and/or interaction between a set of artifacts.

The purpose of a pattern is to facilitate consistent solutions to similar problems so as to simplify the overall design effort and reduce error. Each pattern represents a software solution that solves a repetitive problem within a given context. Creating and using patterns thus promotes software reuse. A pattern can be designed once and used many times. Such reuse tends to lower production costs and save time by eliminating redesign. Pattern reuse also affords higher software reliability and continuity to code design.

Although the concept of patterns originated in the field of architecture and municipal design, patterns are now extensively used for software design. Certain patterns or classes of patterns are recognized across the software industry. At the heart of these industry-accepted software patterns are twenty-three patterns that were first identified in the seminal work on this subject: Design Patterns: Elements of Reusable Object-Oriented Software, by Erich Gamma, Richard Helm, Ralph Johnson, and John Vlissides (Addison-Wesley 1995).

Due to their wide acceptance within the software industry, the foregoing twenty-three patterns (and other standard patterns), have been automated in their implementation by software development tools that allow the patterns to be incorporated by pattern users into software designs. Although such automation of standard patterns is beneficial, a no less important feature of software development tools is the ability to support the definition of new patterns by end users of the tools. New patterns may be required to enforce programming paradigms, standards or conventions within an organization or to provide general accelerators for the development of applications. In many cases, the patterns developed by an organization can constitute significant intellectual property and can be critical in enabling asset-based development for an on-demand business.

Conventional pattern authoring tools tend to support the creation of new patterns by allowing the pattern author to specify pattern implementation algorithms in one or more interpreted or directly executed languages that may be textually or visually constructed. Examples of such languages are scripting languages, constraint and rule languages, special purpose programming languages, and visual modeling languages such as UML (Unified Modeling Language) or the like. Unfortunately, tools that support the creation of patterns using such techniques often introduce significant restrictions on the generality and flexibility of the patterns that can be implemented. Defining patterns in such languages may be unsupported or difficult. If custom languages are used in pattern creation, then new concepts, tools, or development paradigms may also be involved.

Automated tools for applying patterns in a software project (sometimes referred to as pattern instantiation) can also be cumbersome and confusing insofar as they tend to be based on batch mode techniques wherein patterns are applied by specifying all of a pattern's parameter arguments or values at one time. As far as known, current tools do not provide the capability to extend the use of a pattern once it has already been instantiated in the user's code.

It is to improvements in the area of computer software pattern implementation that the present invention is directed. In particular, what are needed are improved tools for pattern definition and application.

SUMMARY OF THE INVENTION

The foregoing problems are solved and an advance in the art is obtained by a novel pattern implementation technique in which a pattern is defined as a software artifact that comprises a pattern signature representing one or more parameters of the pattern and a pattern implementation model representing one or more methods for expanding the pattern in a selected software context by assigning one or more arguments to the one or more parameters. The software context can be one or more of a software model, software code, web page, database, document, file system entity or any other construct. The pattern implementation model can be based on one or more framework code sets, each of which supports the creation of plural patterns by providing a pattern implementation model for a particular software context. The framework code sets can be rendered extensible by a pattern author by virtue of providing methods whose code is adapted to be modified by a pattern author when defining a pattern. The pattern can be implemented as a software artifact written in a general purpose programming language, and may be defined as part of a pattern library comprising plural patterns.

Application of the pattern can be initiated by creating an instance of the pattern in a software context associated with a pattern. A graphical representation of the pattern instance can be created in the software context, including a display of the pattern parameters. A user interface can be provided that allows a pattern user to apply arguments to the pattern parameters in the graphical representation of the pattern instance and to modify the software context according to the arguments. The user interface allows a pattern user to iteratively apply the arguments to the pattern parameters and to remove the arguments from the pattern parameters while modifying the software context according to the argument application and removal operations.

BRIEF DESCRIPTION OF THE DRAWINGS

The foregoing and other features and advantages of the invention will be apparent from the following more particular description of exemplary embodiments of the invention, as illustrated in the accompanying Drawings, in which:

FIGS. 2A, 2B, 2C and 2D illustrate exemplary Java® code associated with the Abstract Factory pattern of FIG. 1;

FIGS. 7B-7I illustrate exemplary Java® code, including "hot spot" code, associated with the pattern and framework of FIG. 8;

DETAILED DESCRIPTION OF EXEMPLARY EMBODIMENTS

1. Introduction

Figure 1:
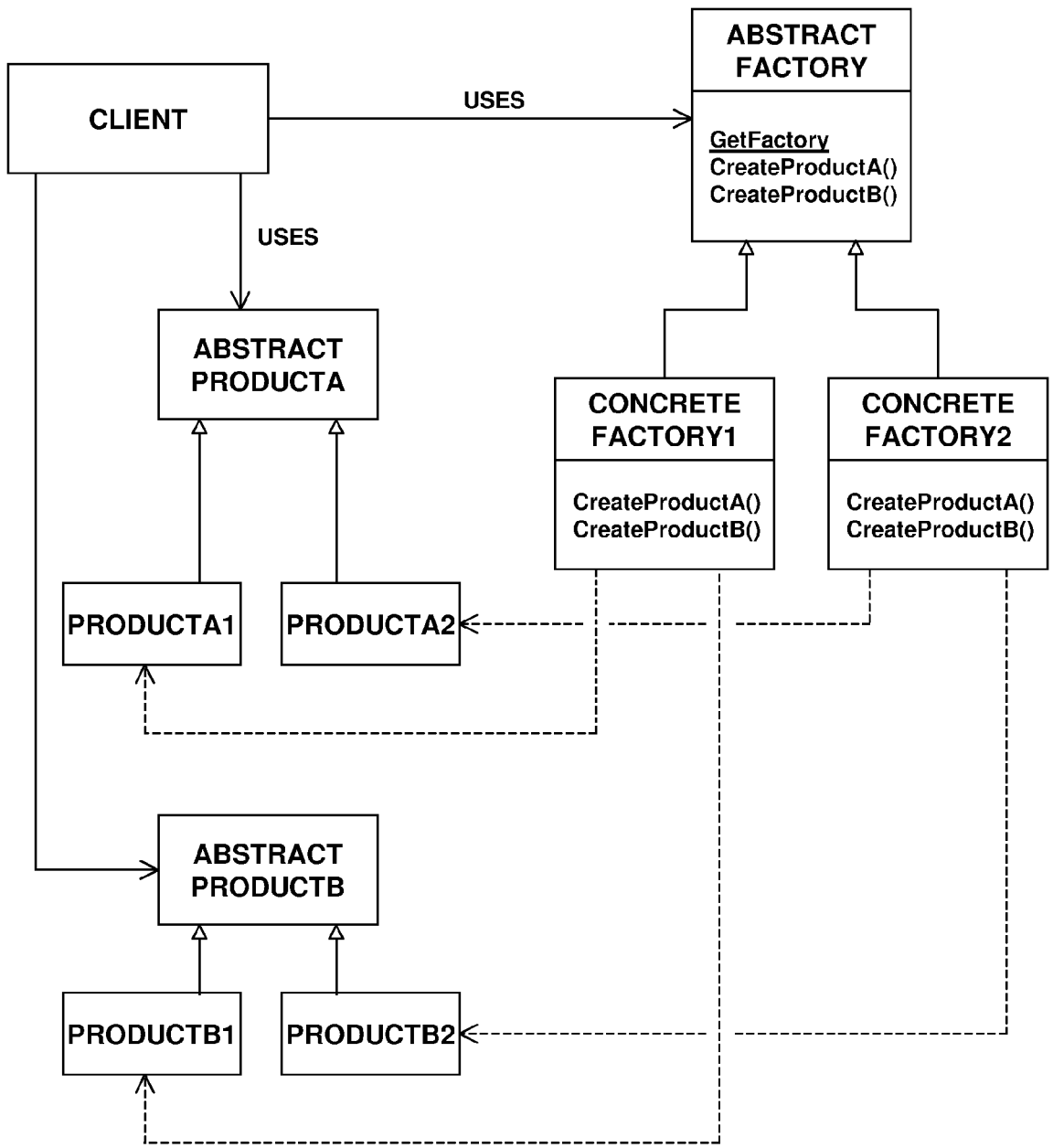
FIG. 1 is a UML class diagram showing a conventional Abstract Factory pattern.

Turning now to the drawing figures wherein like reference numbers indicate like elements in all of the several views, FIG. 1 illustrates the format of a conventional Abstract Factory pattern in order to facilitate understanding of the present invention based on a specific pattern example. The Abstract factory pattern is a creational pattern that was first identified in the "Design Patterns" work cited by way of background above. In object-oriented software development, a "factory" is a software entity where objects are created. The abstract factory pattern provides a single interface for clients to use in creating families of related objects without having to specify concrete classes.

In FIG. 1, the objects of interest to the client are based on the abstract class definitions "PRODUCTA" and "PRODUCTB." Using the analogy of an automobile manufacturing plant, PRODUCTA might be a software representation of an engine while PRODUCTB is a software representation of a transmission. For a given model of automobile, the engine and the transmission are the same. However, for different models, the engine and transmission could be different. In FIG. 1, "PRODUCT A1" and "PRODUCTB1" could respectively correspond to an engine and a transmission for a first model of automobile, and "PRODUCT A2" and "PRODUCTB2" could respectively correspond to an engine and a transmission for a second model of automobile. Rather than require the client to separately define each of these objects, the abstract factory pattern provides a single interface, identified in FIG. 1 as "ABSTRACT FACTORY," that the client can use to create the objects it requires. The "ABSTRACT FACTORY" class is called by the client to create concrete classes of a desired factory type. Continuing the automobile analogy, one factory could pertain to a first model of automobile while another factory pertains to a second model of automobile. These concrete classes are identified in FIG. 1 as "CONCRETE FACTORY1" AND "CONCRETE FACTORY2." These factories can be created by the client by calling the "GetFactory( )" method of "ABSTRACT FACTORY" and specifying the factory type. Each of "CONCRETE FACTORY1" and "CONCRETE FACTORY2" inherit methods from "ABSTRACT FACTORY" for creating the products of interest. In FIG. 1, these methods are identified as "CreateProductA" and "CreateProductB." However, these methods are specialized for each concrete factory, such that "CONCRETE FACTORY1" is configured to create "PRODUCTA1" and "PRODUCTB1," whereas "CONCRETE FACTORY2" is configured to create "PRODUCTA2" and "PRODUCTB2."

The abstract factory pattern approach has the benefit that the client does not need to know about which concrete objects it gets from each of the concrete factories insofar as the client only uses the generic interfaces of the products "PRODUCTA1," "PRODUCTB1," "PRODUCTA2" and "PRODUCTB2." The abstract factory pattern also allows the family (e.g., of automobile models) to grow (by creating new concrete factories) without the need to modify client code.

FIGS. 2A-2D set forth exemplary Java® (Java is trademark of Sun Microsystems, Inc.) code that can be used to utilize an abstract factory pattern. FIG. 2A illustrates code that may be used to create the abstract product classes "PRODUCTA" and "PRODUCTB." Note that the implementation details of each product class are specific to requirements and are not shown. FIG. 2B illustrates code that may be used to create the abstract factory class "ABSTRACT FACTORY." This code includes the GetFactory( ) method, the abstract CreateProductA( )method and the abstract CreateProductB( ) method. FIG. 2C illustrates code that may be used to create the concrete factory class. Note that each concrete factory has specialized methods for creating the concrete product objects products "PRODUCTA1," "PRODUCTB1," "PRO- DUCTA2" and "PRODUCTB2." FIG. 2D illustrates code that may be used by the client to interact with "ABSTRACT FACTORY" in order to create the product objects "PRODUCTA1," "PRODUCTB1," "PRODUCTA2" and "PRODUCTB2."

In order to use a pattern such as the abstract factory pattern discussed above, the pattern user does not need to know how to design the pattern, but proper pattern documentation is needed for the pattern user to locate, select, and apply the pattern. The user needs to know what problem is solved by the pattern, how it is solved and the consequences of applying the pattern. For that reason, one of the components usually associated with a pattern is a comprehensive set of pattern information that typically includes some or all of the following elements:

Pattern name and classification: A conceptual handle and category for the pattern
Intent: The problem addressed by the pattern
Also known as: Other common names for the pattern
Motivation: A scenario that illustrates the problem
Applicability: Situations where the pattern can be used
Structure: Model or diagram of the pattern
Participants: Artifacts in the design
Collaborations: How artifacts in the design collaborate
Consequences: Pattern objectives and tradeoffs
Implementation: Implementation details to consider
Sample Code: Code example in the language of choice
Known Uses: Examples where pattern has been used
Related Patterns: Comparison and discussion of related patterns.

The foregoing information assists pattern users faced with a design problem to select and implement a pattern that is most appropriate to the problem at hand. Such information also facilitates the sharing of patterns within a project, within an organization, or across many organizations.

In one sense, the subject matter shown in FIGS. 1 and 2A-2D, together with the related discussion herein, represents a nearly complete pattern definition for the abstract factory pattern insofar as it contains most of the above-listed categories of information. However, as discussed by way of background above, it is also desirable to provide software tools that can be used to define and apply patterns using automated techniques wherein a pattern is represented as a software entity that can be introduced into a user's software project and expanded by supplying implementation details that enable the pattern to operate on software artifacts specific to the project. The present invention provides such a tool but improves upon prior art techniques by virtue of a design approach that attempts to achieve at least some or all of the following objectives:

Generality—the application of a defined pattern should be able to introduce arbitrarily general structure and behavior into a software system.

Flexibility—techniques and algorithms for pattern application should not be restricted.

Composability—patterns should be able to reuse other patterns and other available software assets, such as programming frameworks and libraries.

Familiarity—creation of patterns should not involve a significant education about new concepts, new tools, or new development paradigms.

Usability—creation of patterns should involve an easy, well-supported, and well-documented development process.

Maintainability—creation of patterns should support debugging, testing, releasing, and updating of the pattern and the software systems to which the patterns have been applied.

Discoverability—users who apply patterns must be able search among available patterns and gain an understanding of the context, semantics, and consequences of applying a given pattern. A desirable aspect of the creation of patterns is the ability to distribute the patterns within an organization, or publicly, and to support and maintain the patterns and software systems to which the patterns have been implemented.

II. Pattern Definition

Figure 3:
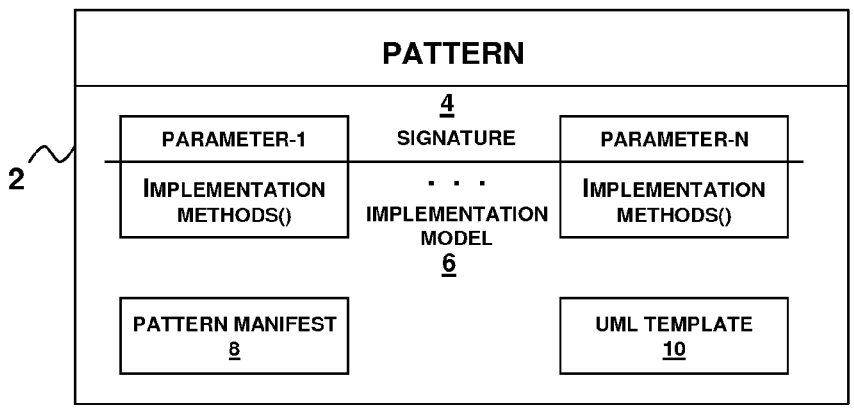
FIG. 3 is a block diagram showing an exemplary structure for defining a pattern.

Turning now to FIG. 3, an exemplary pattern 2 can be represented as a collection of software artifacts, such as object-oriented classes, that define the pattern in terms of (1) a pattern signature 4 comprising the pattern's parameters and parameter types, and (2) an implementation model 6 comprising methods that allow the pattern parameters to be manipulated in order to expand the pattern within a pattern user's software development model. Two related assets, a pattern descriptive manifest 8 and a UML template 10, may also be associated with the pattern 2 to provide optional additional functionality. The pattern manifest 8 allows the pattern 2 to be exported for search purposes. It provides descriptive information about the pattern that can be accessed without executing any of the code for the pattern. For example, if the pattern manifest 8 is compliant with the Reusable Asset Specification (RAS) standard of the Object Management Group, it can be exported to a RAS repository (not shown in FIG. 3) to facilitate subsequent discovery, selection and application of the pattern 2 by a pattern user. The UML template 10 allows the pattern to be applied within the context of a UML reference model.

Figure 4:
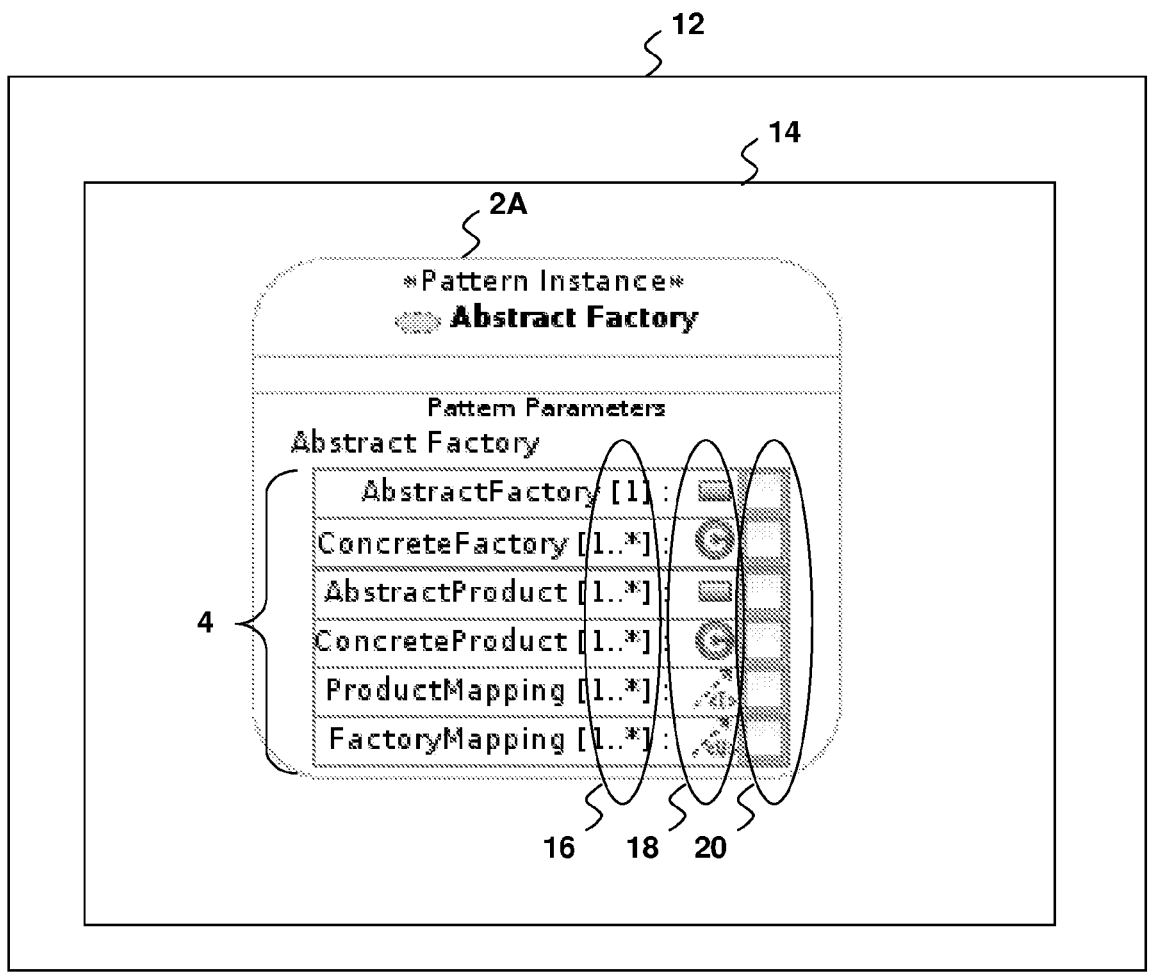
FIG. 4 is an exemplary graphical representation of a pattern in a diagram displayed on a graphical display.

To better understand how a pattern can be represented in the foregoing fashion, it will be helpful to consider the pattern 2 when displayed in a graphical diagram associated with a pattern user's UML reference model. FIG. 4 illustrates a graphical display window 12 in which the pattern 2 is graphically represented at 2A as a set of notational elements within a pattern user's UML diagram 14. For ease of understanding, the pattern 2 is assumed to be an abstract factory pattern as previously described with reference to FIGS. 1 and 2A-2D. The pattern signature 4 of the pattern 2 comprises four parameters that correspond to the abstract factory elements described above. These parameters are respectively labeled "Abstract Factory," Concrete Factory," Abstract Product" and Concrete Product." Two additional parameters, respectively identified as "Product Mapping" and "Factory Mapping," are relationship parameters used to specify relationships between the other parameters. The "Product Mapping" parameter is concerned with the generalization/implementation relationship between concrete products and abstract products. The "FactoryMapping" parameter defines the concrete products that are created by a given concrete factory.

In the graphical representation of FIG. 4, the parameter names are followed by a multiplicity designation 16 comprising a bracketed multiplicity value that indicates the number of software artifacts (e.g., classes, interfaces, etc.) that can be assigned to each parameter. Such artifacts are referred to as parameter arguments (or values). Following the multiplicity designation 16 (reading left to right) are two icons 18 and 20. The first icon 18 represents the parameter type (i.e. the type of arguments that may be bound thereto). The second icon 20 represents the bound state of the parameter (i.e., whether any arguments have been assigned. In FIG. 4, none of the parameters are bound.

Figure 5:
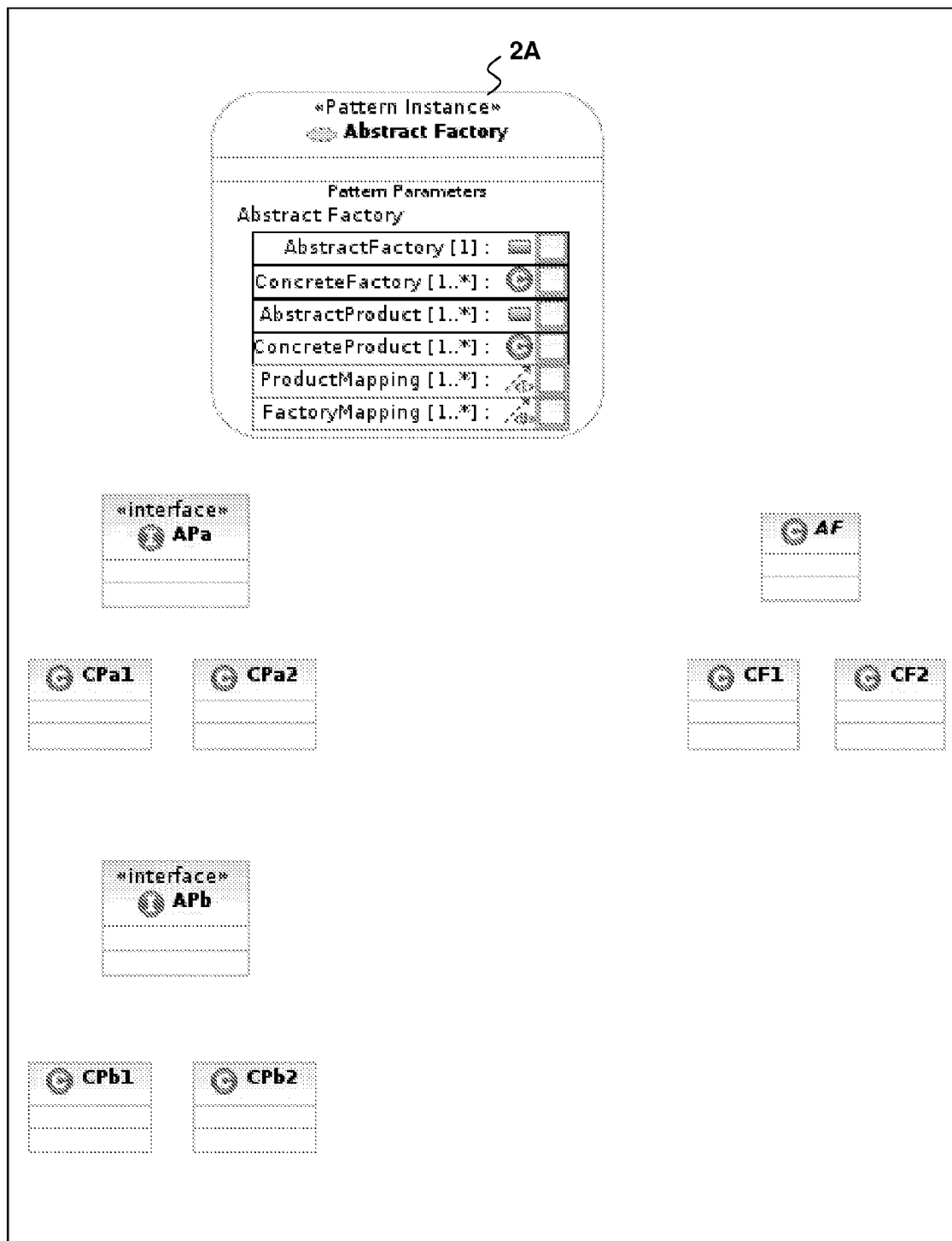
FIG. 5 is a graphical representation of the abstract factory pattern of FIG. 4 in combination with additional graphical representations of software artifacts.

Turning now to FIG. 5, the pattern representation 2A is shown in conjunction with a set of artifacts created by a pattern user in the user's UML diagram 14. These artifacts are part of the pattern user's underlying UML reference model, and include an abstract factory class "AF," two concrete factory classes "CF1" and "CF2", two abstract product interfaces "APa" and "Apb," and four concrete product classes "CPa1," "Cpa2," "CPb1," and "CPb2."

Figure 6:
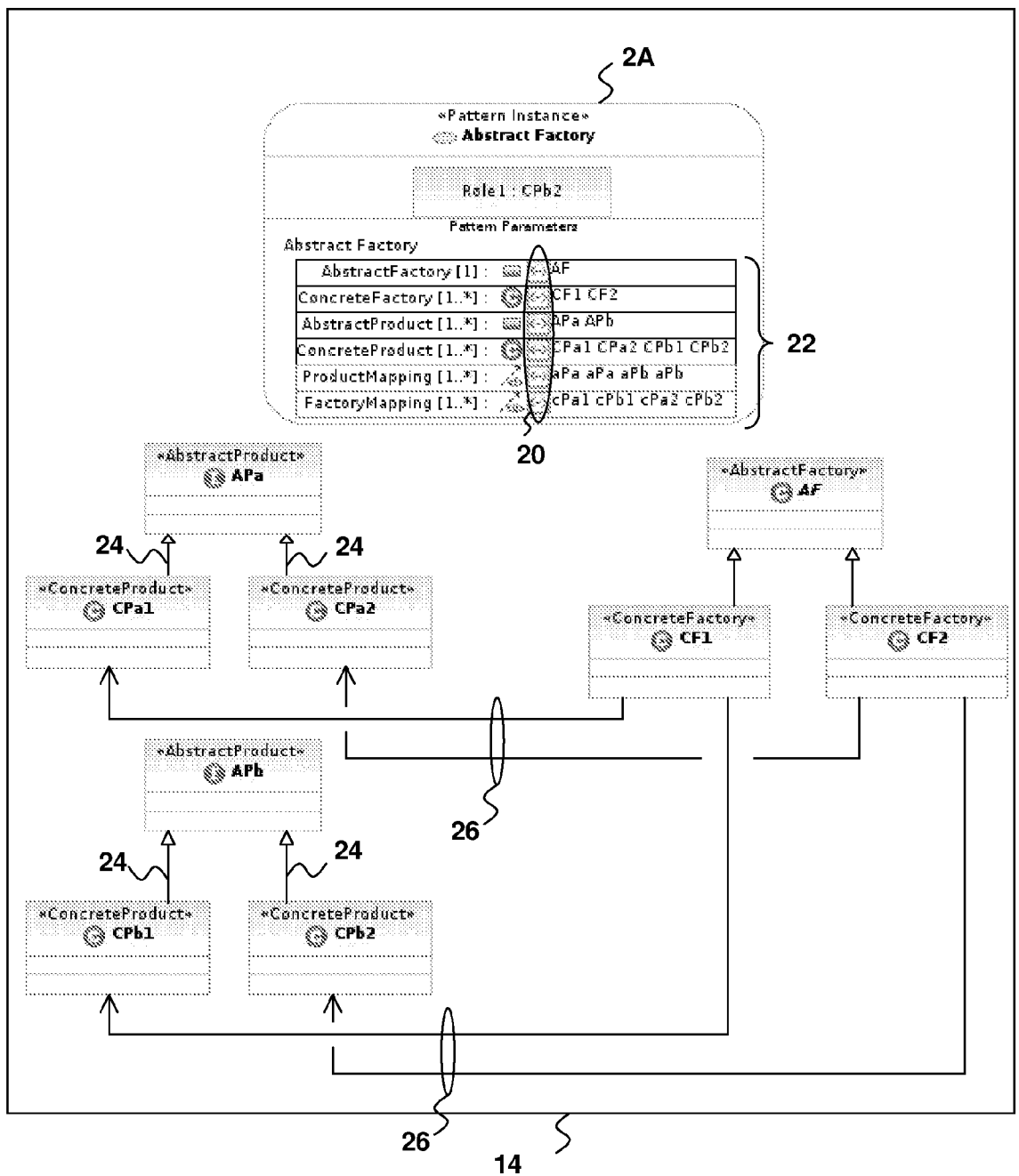
FIG. 6 is a graphical representation according to FIG. 5 following expansion of the abstract factory pattern.

Turning now to FIG. 6, the pattern representation 2A is shown after the artifacts of FIG. 5 have been bound as arguments to the pattern parameters 4 as part of the pattern expansion process. As illustrated by reference numeral 22, an expanded compartment space is now associated with each parameter to contain the identifications of the bound artifacts. It will be seen that the class "AF" is bound to the "Abstract Factory" parameter, the classes "CF1" and CF2" are bound to the "Concrete Factory" parameter, the interfaces "APa" and "APb" are bound to the "Abstract Product" parameter, and the classes "CPa1," "CPa2," "CPb1" and "CPb2" are bound to the Concrete Product parameter. In addition, the "Product Mapping" parameter contains arguments reflecting the implementation relationship between the abstract products "APa" and "APb" on one hand, and the concrete products "CPa1," "CPa2," "CPb1" and "CPb2" on the other hand. These implementation relationships are illustrated in the diagram 14 by the various connecting lines 24. Similarly, the "Factory Mapping" parameter contains arguments reflecting the creational relationship between the concrete factories "CF1" and "CF1" on one hand, and the concrete products "CPa1," "CPa2," "CPb1" and "CPb2" on the other hand. These creational relationships are illustrated in the diagram 14 by the various connecting lines 26. The icon 20 associated with each parameter is also filled in to indicate that a binding has occurred. Each artifact affected by the pattern expansion is also modified in the user's diagram 14 reflect that the artifact has been bound to a pattern parameter. In particular, a keyword/stereotype label is added to each artifact to indicate the parameter to which the artifact has been bound. The foregoing modifications to the pattern user's UML model artifacts, and to the underlying relationships between artifacts, reflect the method operations of the implementation model 6 of the pattern 2. The implementation model thus represents the actions to be taken when the pattern 2 is applied to conform a user's software artifacts to the constraints dictated by the pattern.

Figure 7:
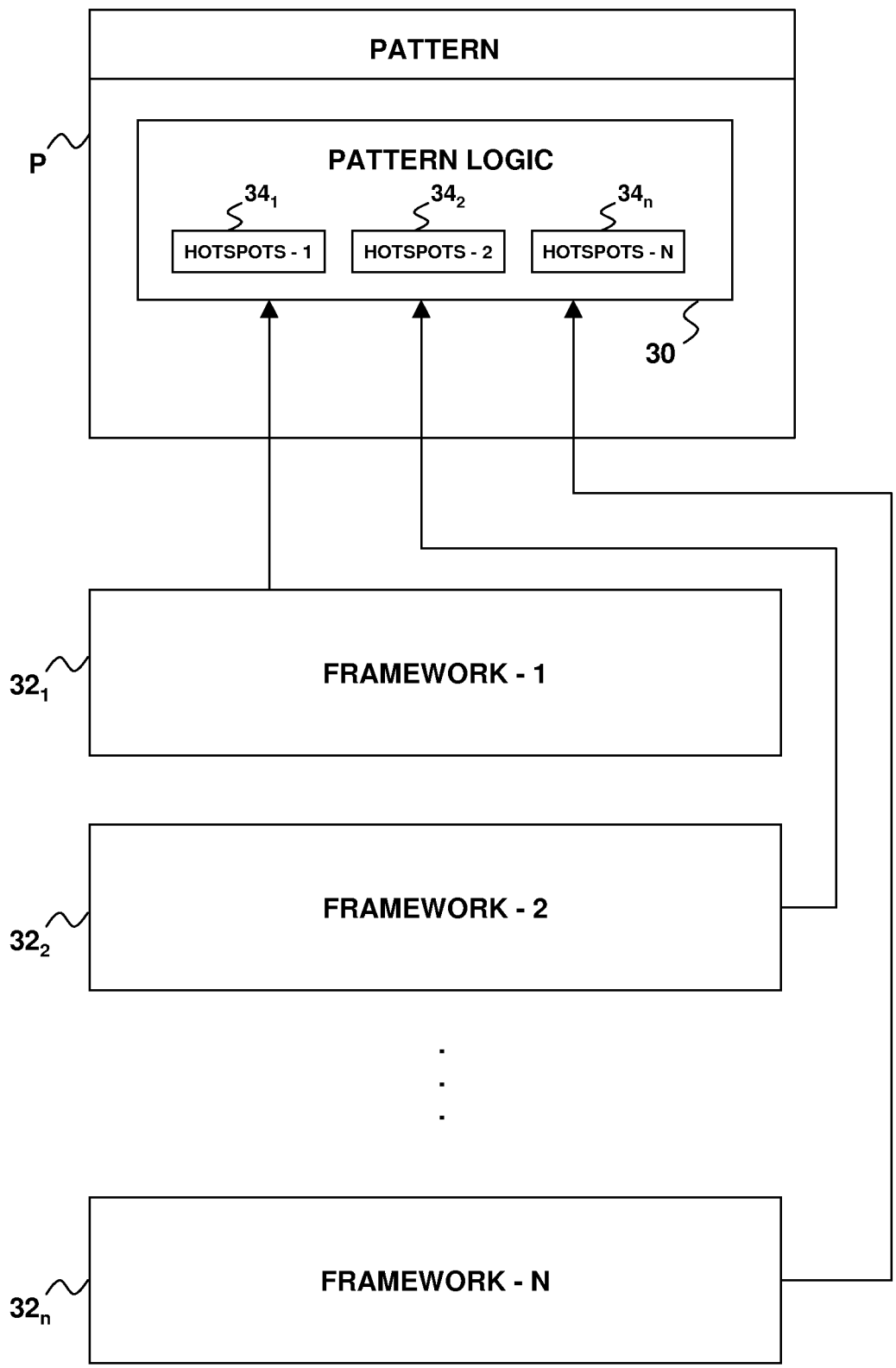
FIG. 7 is functional block diagram showing a pattern supported by plural frameworks.

Turning now to FIG. 7, a hypothetical pattern P comprises pattern logic 30 that defines each parameter associated with the pattern (i.e. the pattern signature), together with their allowed types and permissible argument multiplicity. The pattern logic 30 also provides the methods required to bind artifacts to the pattern parameters and create artifact relationships according to the pattern's implementation model. All changes to a user's software development project that occur as a result of pattern expansion are thus the result of the pattern logic 30 executed by the pattern P.

In an exemplary embodiment of the invention, the pattern logic 30 is implemented as a specialized module of code in a general programming language. As used herein, a "general programming language" refers to a programming language that is not specific to a particular field (e.g., as the SQL language is specific to database transactions) and instead can be used to write software for use in a variety of fields. For example, the pattern logic 30 can be written using the Java® programming language as a set of object oriented classes and related programming constructs. In that case, the pattern signature 4 and the pattern implementation model 6 of FIG. 3 (represented by the pattern logic 30 of FIG. 7) will be constructed as a Java® source code file (*.java) that is compiled into a Java® class file (*.class). Other general programming languages, such as C++, C, etc., could also be used. The advantage of using a general programming language, as opposed to special purpose languages, is that patterns can be written to perform arbitrarily complex computations and manipulate the artifacts of the software system in any way that is supported by the artifact types. Similarly, patterns can be written to support well-defined interfaces for applications so that it is relatively easy to author patterns and to exploit other reusable software assets. In addition, the development and maintenance of pattern code can be done with the same tools and processes as for any other software artifact, such as compilers, debuggers, collaboration assistants, etc. Similarly, the tools and techniques used for maintaining any general-purpose software artifact through the release and maintenance lifecycle can be applied to patterns.

In order to facilitate rapid, less error-prone pattern development, the pattern logic 30 is supported by one or more base code frameworks that are each applicable to a specialized context for pattern application. In FIG. 7, wherein the pattern logic 30 is assumed to be written using the Java® programming language, these contexts-specific base code implementations are built as Java® frameworks 32. As persons skilled in the art will appreciate, a Java® framework represents a collection of classes that synergistically support a particular programming goal. Relative to the frameworks 32, each framework is used to support the application of patterns to a different software development context utilized by a pattern user. For example, one framework $32_1$ (labeled "Framework-1") could be built to support the creation of patterns that operate in the context of a UML reference model development environment. Another framework $32_2$ (labeled "Framework-2") could be built to support the creation of patterns that operate in the context of a code-based development environment based on a programming language such as Java®, C++, etc. Still another framework $32_n$ (labeled "Framework-N") could be built to support the creation of patterns that operate on file system entities, such as files or particular types of files. Additional frameworks supporting other software contexts could also be provided. Examples of such contexts include (but are not necessarily limited to) web page development, database development, document development, or any other context wherein patterns can be used to aid the development process.

Each framework 32 can be written to provide base classes that realize context-specific pattern implementation characteristics. The framework $32_1$ may provide base classes that assist in modifying a pattern user's UML reference model as artifacts of the reference model are bound to the pattern parameters during pattern expansion. Similarly, the framework $32_2$ may provide base classes that assist in modifying a pattern user's software code as the pattern is expanded. Likewise, the framework $32_1$, may provide base classes that assist in modifying a pattern user's files during pattern expansion. A further advantage of using frameworks is that each framework 32 can be written so as to be extensible in order to expand its functionality in given context, or even adapt it for use in a new context or to operate in more than one context.

Although the pattern logic 30 is supported by one or more of the underlying frameworks 32, the frameworks may be written to leave the pattern author with limited portions of code 34 (termed "hot spots") to complete, override or extend during pattern design. For example, during pattern authoring, certain operations representing the hot spots 34 may not be fully implemented in the framework code, but code stubs will be created with an indication (e.g., a source code comment) to the pattern author that additional code should be added to complete the operation. One exemplary portion of the framework code that could be written by the pattern author would be an expand( )method for expanding the parameters of a pattern to reflect the assignment of parameter values (see example below). This method may be defined by one of the frameworks 32 but the method operations may be left unwritten (e.g., by having the framework define an abstract method), or written only to perform default actions, it being intended that the pattern author will create or modify the method body code to perform particular desired actions. It will be appreciated that the use of frameworks 32 with hot spots 34 significantly reduces the amount of code required to implement patterns while focusing the pattern author on creating the unique added value of the pattern.

Figure 7A:
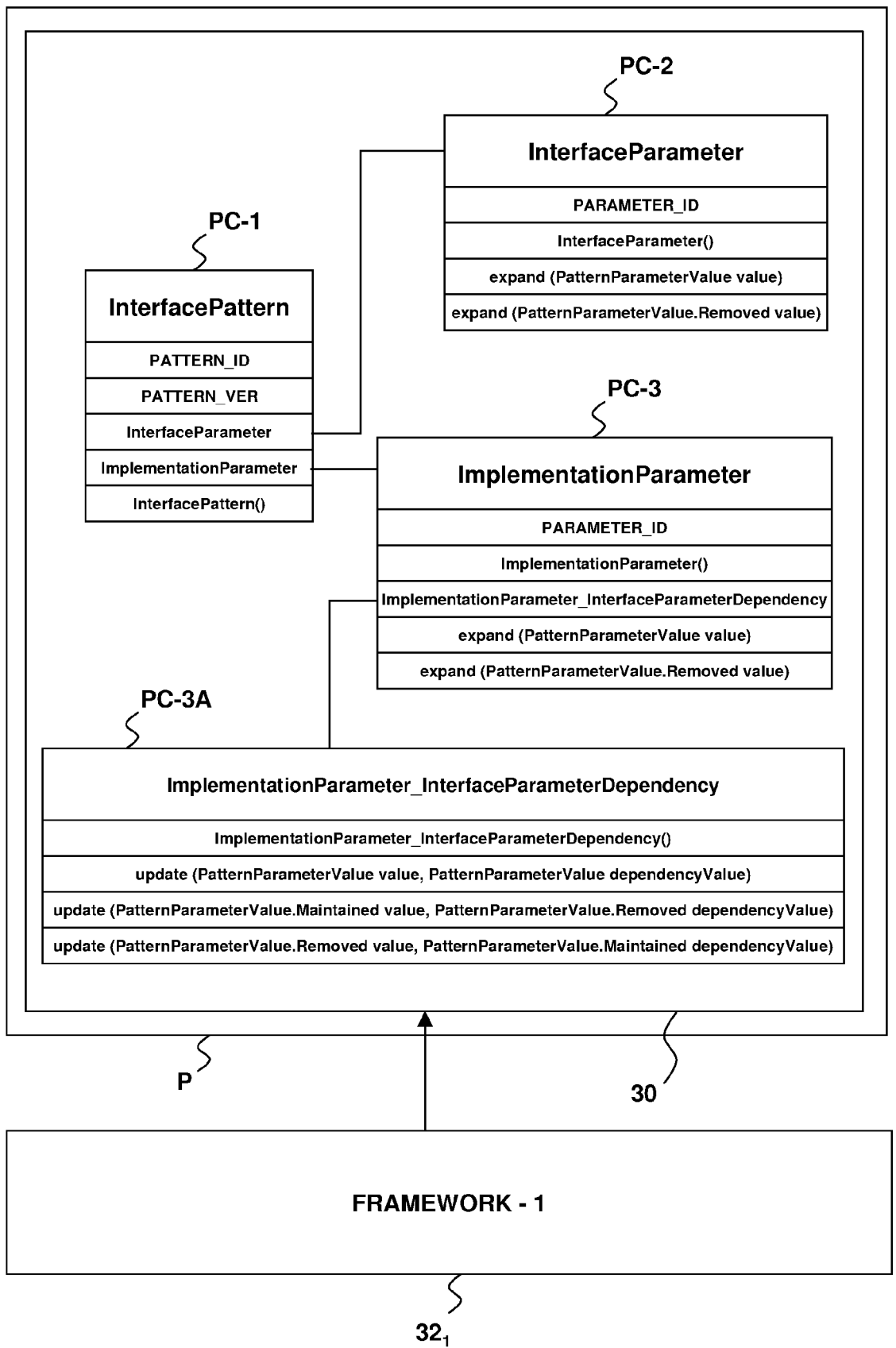
FIG. 7A functional block diagram showing a pattern and its parameters implemented as a set of object-oriented classes and supported by a framework.

FIG. 7A exemplifies the use of hot spots in a hypothetical pattern P whose pattern logic is written using the Java® programming language. The pattern P is represented as a Java® class (PC-1) called "InterfacePattern" that comprises a pattern identifier variable ("PATTERN_ID"), a pattern version variable ("PATTERN_VER"), and a constructor (InterfacePattern( ). The InterfacePattern class also instantiates two parameter classes (PC-2 and PC-3) respectively called "InterfaceParameter" and "ImplementationParameter." The InterfaceParameter class is assumed to represent a Java® interface and the ImplementationParameter class is assumed to represent a Java® class that implements the Java® interface represented by the InterfaceParameter class. Each parameter class comprises a parameter identifier variable ("PARAMETER_ID"), a constructor (InterfaceParameter( ) and ImplementationParameter( ) respectively), and two "expand( )" methods for expanding the pattern parameters with arguments. The first "expand( )" method is "expand(PatternParameterValue value)." This method is used to perform an action in a pattern user's software context when a parameter argument is assigned. The second "expand( ) method is expand(PatternParameterValue.Removed value)" used to perform an action in a pattern user's software context when a parameter argument is removed. The ImplementationParameter class also instantiates a class (PC-3A) called "ImplementationParameter_InterfaceParameterDependency." This class has a constructor "ImplementationParameter_InterfaceParameterDependency( ) and three "update( )" methods for managing the dependency between the InterfaceParameter and the ImplementationParameter classes. The first "update( )" method is "update (PatternParameterValue value, PatternParameterValue dependencyValue)." This method is used to perform a dependency update action in a pattern user's software context when a parameter argument is assigned either parameter. The second "update( )" method is "update (PatternParameterValue.Maintained value, PatternParameterValue.Removed dependencyValue)." This method is used to perform a dependency update action in a pattern user's software context when an argument is removed from the ImplementationParameter and maintained in the InterfaceParameter. The third "update( )" method is "update (PatternParameterValue.Removed value, PatternParameterValue.Maintained dependencyValue)." This method is used to perform an action in a pattern user's software context to when an argument is removed from the InterfaceParameter and maintained in the ImplementationParameter.

FIGS. 7B-7E set forth exemplary Java® source code that can be created by default on behalf of a pattern author using one of the framework $32_1$-$32_n$, such as the framework $32_1$ (Framework-1) adapted to operate in a UML modeling context. This code defines each of the classes described above with reference to FIG. 7A. In FIG. 7B, the portion of the code that defines the InterfacePattern class and its variables is set forth. As shown by the use of bold typeface, the framework code can be imported by way of the Java® import directives at the beginning of the source code file. In FIG. 7C, the portion of the code that defines the InterfaceParameter class and its variables is set forth. The boldface "TODO" comments accompanying the "expand( )" method declarations advise the pattern author that these methods are "hot spots" whose bodies need to be written to provide desired functionality. In FIG. 7D, the portion of the code that defines the ImplementationParameter class and its variables is set forth. The boldface "TODO" comments accompanying the "expand( )" method declarations advise the pattern author that these methods are "hot spots" whose bodies need to be written to provide desired functionality. In FIG. 7E, the portion of the code that defines the ImplementationParameter_InterfaceParameterDependency class is set forth. The boldface "TODO" comments accompanying the "update( )" method declarations advise the pattern author that these methods are "hot spots" whose bodies need to be written to provide desired functionality.

The hot spots shown by the code examples of FIGS. 7B-7E can be modified in any desired fashion by a pattern author. FIGS. 7F, 7G and 7H illustrate three examples of such hot spot modifications. In FIG. 7F, the expand( )methods of the InterfaceParameter class are written to print out a simple message whenever these methods are invoked by a pattern user adding or removing a parameter argument to a parameter in the user's UML diagram. FIG. 7G shows the same code for the expand( )methods of the ImplementationParameter class. In FIG. 7H, the update( )methods of the ImplementationParameter_InterfaceParameterDependency class are written to print out a simple message about dependency changes whenever artifacts are assigned to or removed from InterfaceParameter and the ImplementationParameter. As shown in FIG. 7I, additional update( ) code could be written for the first update( )method of the ImplementationParameter_InterfaceParameterDependency class that causes UML dependency reference lines to be displayed/removed between UML artifacts corresponding to the InterfaceParameter and ImplementationParameter classes when such artifacts are assigned to these parameters in a pattern user's UML diagram.

Figure 8:
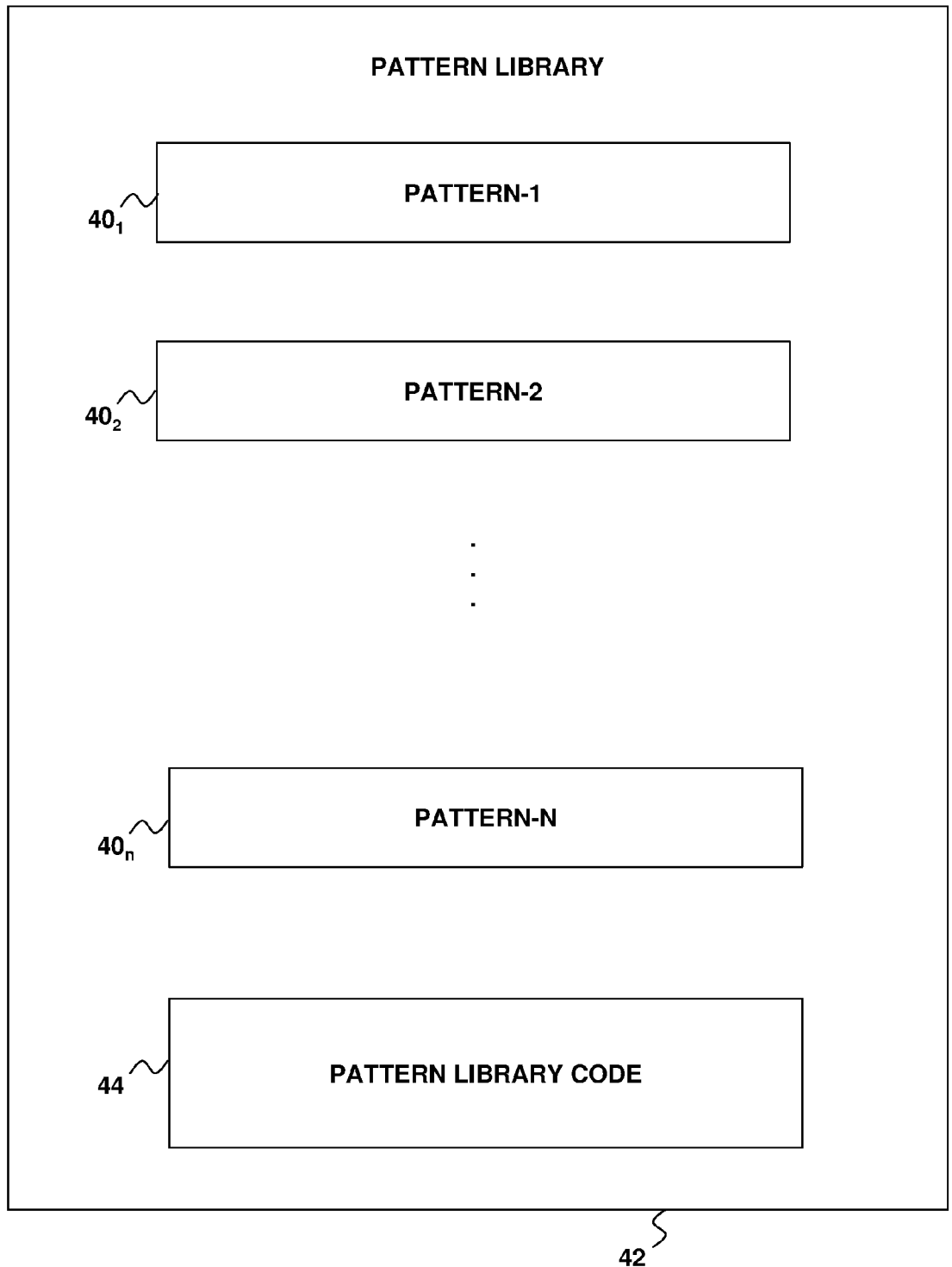
FIG. 8 is a functional block diagram showing a pattern project comprising plural patterns in association with a pattern library.

Turning now to FIG. 8, plural patterns $40_1$-$40_n$ may be created within the context of a pattern library 42 that comprises pattern library code 44 to facilitate packaging of the patterns for subsequent selection and application. In an exemplary implementation of the invention, the pattern library code 44 is created in the Java® programming language as a Java® source file (*.java) compiled into a java class file (*.class). In a still further exemplary implementation of the invention, the pattern library 42 is packaged as a "plug-in" to a software development platform, such as the Eclipse Platform integrated development environment available at the eclipse.org website. The Eclipse Platform is a graphical software development tool whose functionality is extensible through the provision of service extension points that are designed to accommodate custom plug-in code modules. When a module implementing the pattern library 42 is plugged in to the Eclipse Platform, it becomes available for use by a pattern user.

Figure 9:
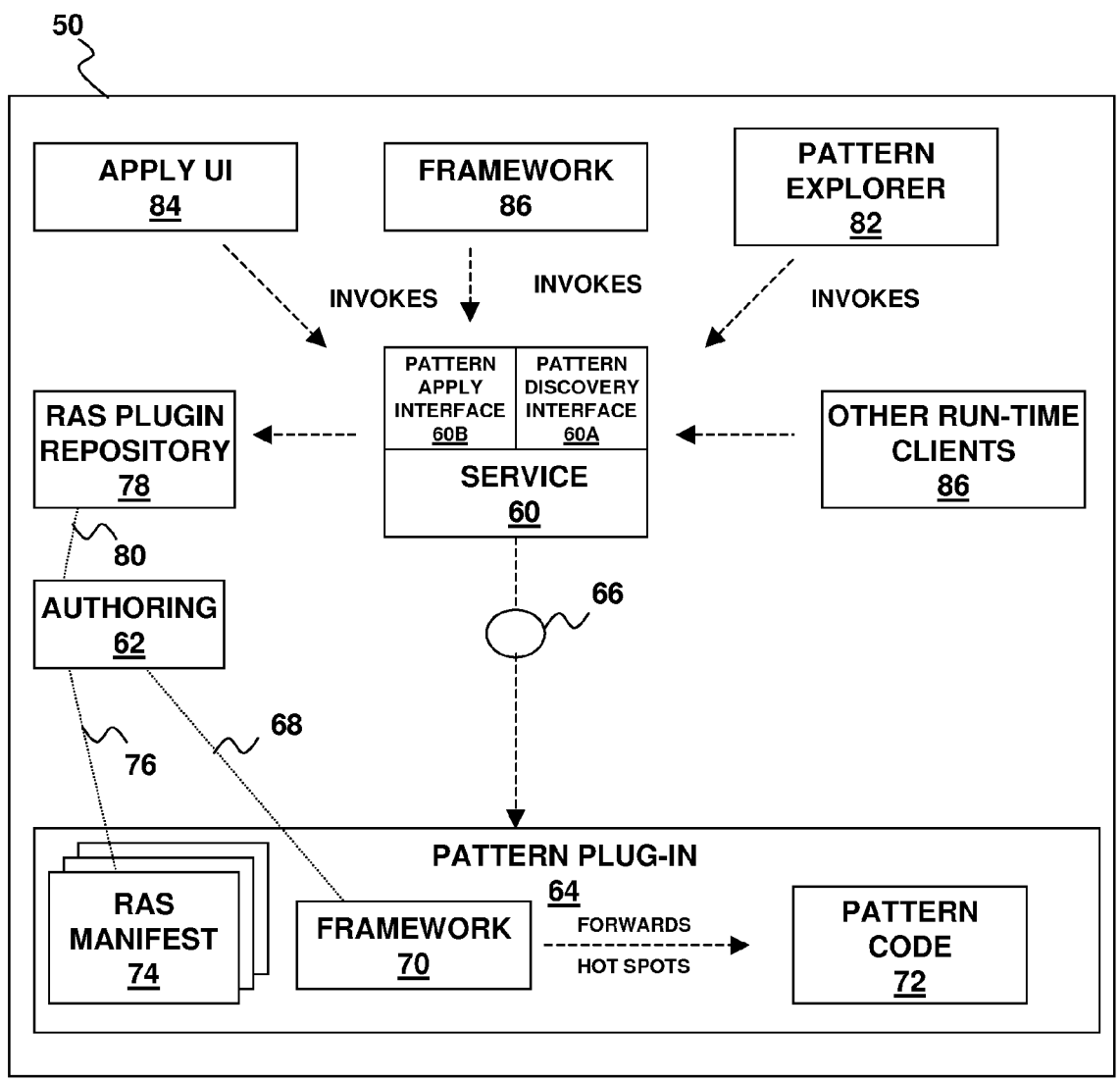
FIG. 9 is a functional block diagram showing an exemplary pattern implementation system.

Turning now to FIG. 9, a Java®/Eclipse-based pattern implementation system 50 represents an exemplary environment in which patterns may be created, managed and applied to software development projects. The pattern implementation system 50 is built on top of an Eclipse Platform instance 52, which in turn runs within a Java® runtime/API environment 54 supported by an operating system 56 that executes on a hardware platform 58. The pattern implementation system 50 includes a service plug-in component 60 that provides two primary interfaces, namely, a first interface 60A that is responsible for managing the discovery of patterns within pattern projects, and a second interface 60B that is responsible for pattern application. Either by using a pattern authoring tool 62 or using standard Eclipse plug-in development tools (not shown), a pattern author creates a pattern library as an Eclipse plug-in 64 that implements an extension point 66 defined by the service component 60. The dashed line 68 in FIG. 9 signifies this pattern library creation process. As described above, patterns associated with the pattern library plug-in 64 may import a pattern framework 70 with base classes that realize the required pattern interfaces and which provide significant default behavior, leaving the pattern author with limited portions of the pattern code 72 to complete in the pattern implementation at various hot spot locations. The authoring tool 62 may also be used to build a RAS manifest 74 for the pattern library and each pattern therein. Each pattern RAS manifest 74 associated with a pattern in FIG. 9 corresponds to the RAS manifest 8 of FIG. 3. The dashed line 76 in FIG. 9 signifies this build operation. Alternatively, the RAS manifests 74 can be produced manually by the pattern author. Testing of the patterns can be performed according to standard Eclipse techniques using a runtime workbench. Once the pattern library plug-in 64 is complete and tested, the author can use conventional RAS tooling (not shown) to package the pattern library as a reusable asset for discovery by pattern users. This links (or copies) the RAS manifests 74 to a RAS plug-in repository 78. The dashed line 80 in FIG. 9 illustrates this operation.

As indicated above, the service component 60 provides the two interfaces 60A and 60B that respectively facilitate the discovery and application of patterns associated with the pattern library plug-in 64. At start-up time, the service component 60 queries the RAS plug-in repository 78 to locate all plug-ins that implement the service extension point 66. This search detects all of the RAS manifests in the identified plug-ins and produces a catalog of all patterns that are available for application. The service component 60 builds internal data structures that capture the pattern catalog. User interface components, such as the Pattern Explorer 82, can be provided to allow a pattern user to browse available patterns and learn about their use and behavior (from the RAS manifest information). When the pattern user launches the pattern explorer 82, the latter invokes the pattern discovery interface 60A of the service component 60, requesting a list of the available patterns or specifying a search request based on search keywords. The service component 60 returns the requested information based on its RAS-originated data structures. In this way, the service component 60 facilitates discoverability of pattern assets without the overhead of loading each associated pattern library plug-in 64.

An apply user interface 84 allows a pattern user to apply a pattern discovered through the pattern explorer 82 (or specified in any other way). A gesture (e.g., drag and drop) causes the apply user interface 84 to request a pattern instance from the pattern apply interface 60B of the service component 60. The service component 60 causes the associated pattern library plug-in 64 to be installed in the user's Eclipse instance. The service component then creates an instance of the pattern by calling into the pattern code 72. As described in section III below, the application (expansion) of the pattern can then be completed with other user interface gestures that invoke the pattern code 72 by making calls to the generated pattern instance through the framework 70.

In some cases, a pattern being applied may be composed of or use other patterns in its implementation. In that case, the framework associated with such a pattern (shown by reference numeral 86) may call the pattern apply interface 60A of the service component 60 to create other pattern instances of pattern code from the same or different pattern library plug-in 64. The application (expansion) of those patterns will be completed by calls through the framework 86 into the other pattern instances.

III. Pattern Application

Figure 10:
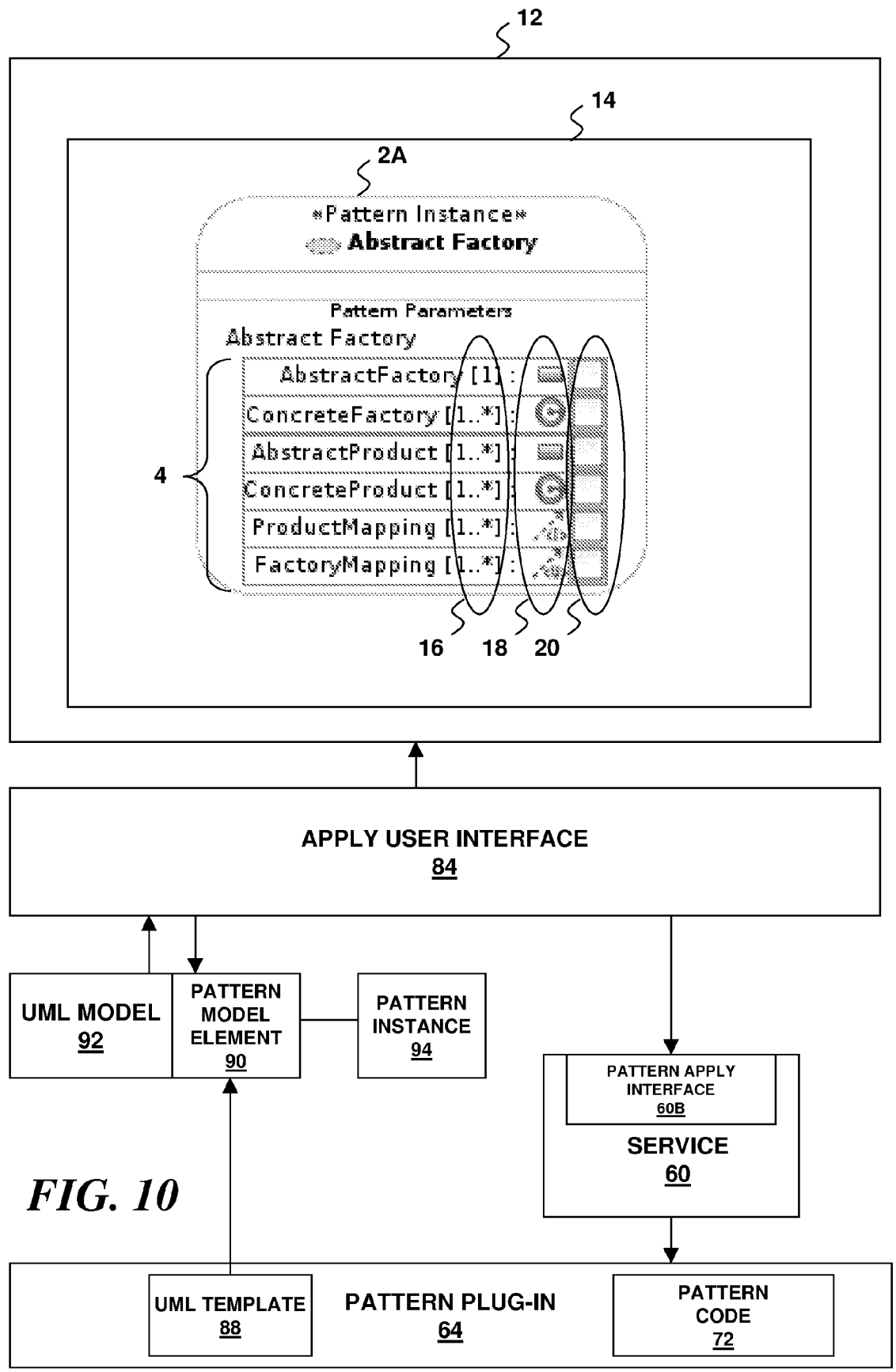
FIG. 10 is a functional block diagram showing elements of the pattern implementation system of FIG. 9 and a graphical representation of an abstract factory pattern.
Figure 11:
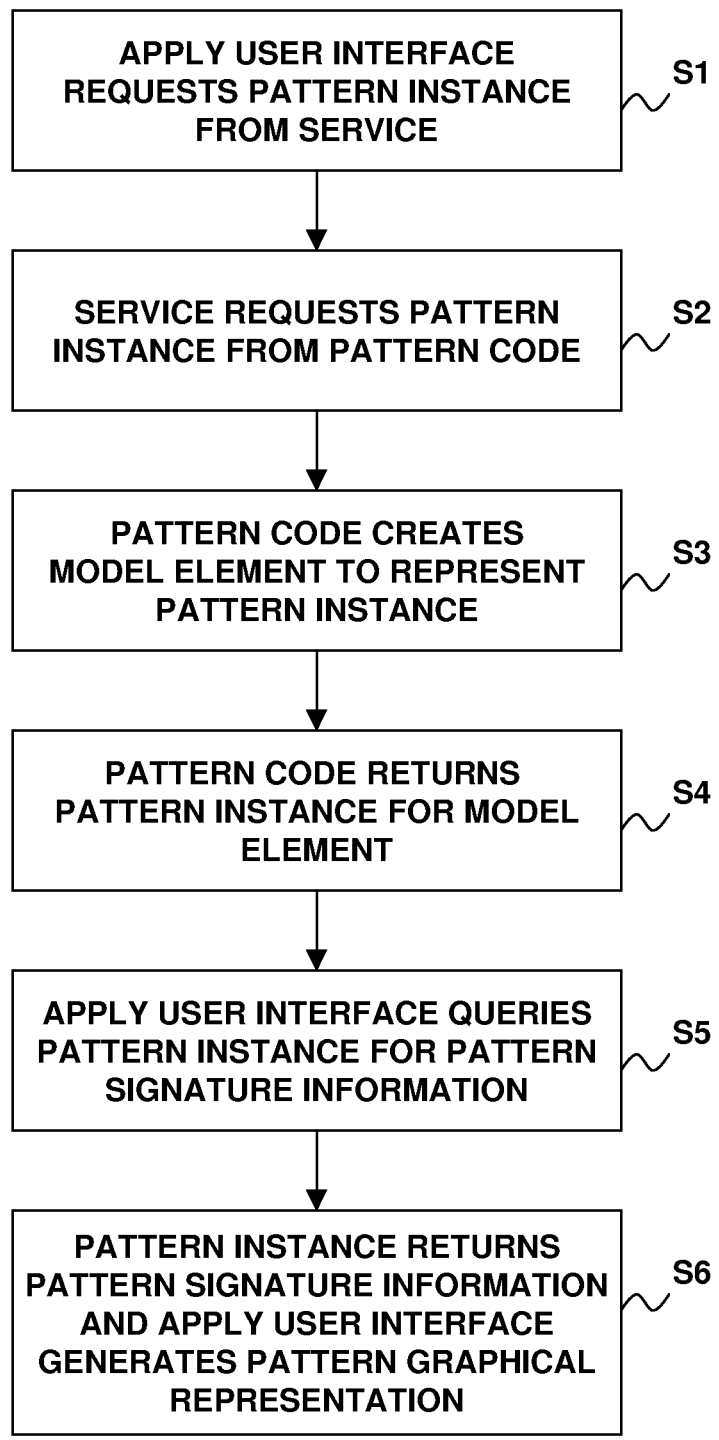
FIG. 11 is a flow diagram showing exemplary steps for instantiating a pattern.

Turning now to FIG. 10, the apply user interface 84 of FIG. 9 is shown in its role as an agent for generating the UML diagram 14 in the display window 12 of FIG. 4. Within the UML diagram 14 is the graphical representation 2A of the pattern 2 of FIG. 3. Assuming the pattern 2 is part of the pattern library plug-in 64 of FIG. 9, the application of the pattern 2 can be initiated in a manner now to be described. With additional reference to FIG. 11, pattern application may begin with a first step S1 in which the apply user interface 84, following a gesture by the pattern user (such as dragging and dropping a pattern representation from the pattern explorer 82 onto the diagram 14), requests the pattern apply interface 60B of the service component 60 to create an instance of the pattern for a given target element (in this case the diagram 14). In step S2, the service component 60 invokes the pattern code 72 for the requested pattern in the pattern library plug-in 64 to create a pattern instance. In step S3, the pattern code 72 uses the UML template 88 associated with the requested pattern (corresponding to the UML template 10 of FIG. 3) to create an appropriate model element 90 to represent the pattern instance in the pattern user's UML model 92. In step S4, the pattern code 72 returns a pattern instance 94 for the model element 90. In step S5, the apply user interface 84 queries the pattern instance 94 for pattern signature information. In step S6, the pattern instance 94 returns the pattern signature information and the apply user interface 84 constructs the pattern graphical representation 2A in the diagram 14.

It should be understood that dragging and dropping a pattern representation from the pattern explorer 82 to the diagram 14 is not the only way that pattern application can be initiated. Other techniques include dragging and dropping a pattern representation from the pattern explorer 82 to an existing element in the diagram 14. In that case, the corresponding model element in the UML model 92 represents the instance of the applied pattern in addition to the element's original context in the model. Another technique is to expand a pattern representation in the pattern explorer 82 to show its parameters, then drag and drop one of the parameters to an existing model element in the diagram 14. In that case, the pattern instance is created with the drop target element bound to the selected parameter. Still another technique is to apply a pattern using a wizard sequence in which the pattern user is presented a series of interactive dialog windows prompting the user to provide the relevant information needed for pattern application.

Once the pattern representation 2A is displayed, the pattern user may use conventional user interface gestures to perform pattern expansion on the parameters of the pattern signature 4 while the apply user interface 84 provides a mechanism for mapping the pattern parameters to argument values. During this process, the UML model 92 can be saved at any time and subsequently reopened for the purpose of assigning additional parameter arguments, removing previously assigned parameter arguments, and substituting one argument for another. Using this approach, the pattern 2 can be advantageously applied to the pattern user's UML model 92 in an iterative fashion. Argument values can be iteratively applied (bound) to the parameters of the pattern 2, and the results of the binding are automatically calculated and displayed. This interactive binding approach provides sequential and cumulative feedback to the user and is superior to batch methods where all arguments to a pattern and its parameters need to be specified at one time. This feature is particularly useful for certain complex patterns, such as the abstract factory pattern, which may expose parameter(s) that can have multiple values bound to them (multiplicity >1).

Figure 12:
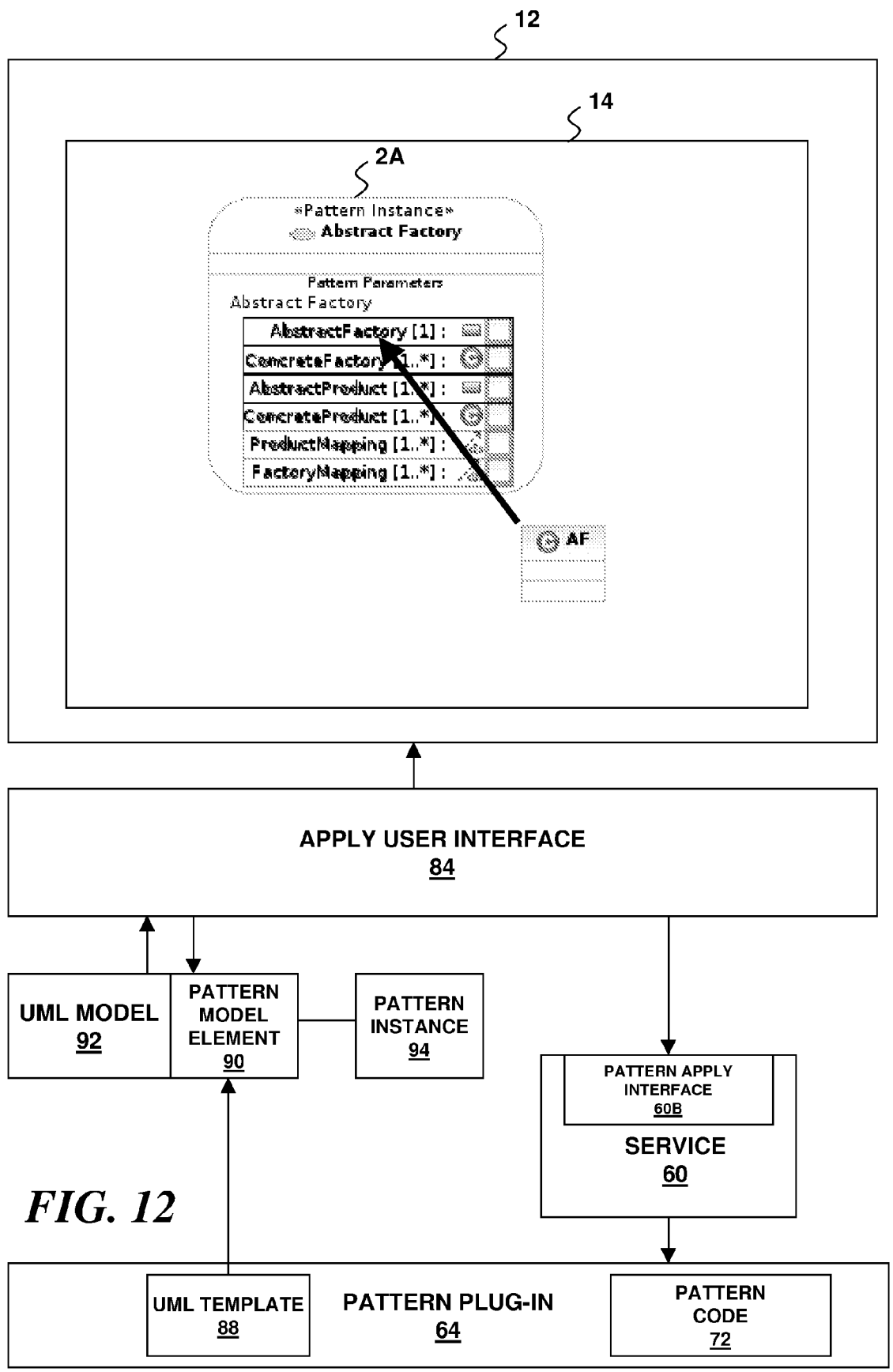
FIG. 12 is a view according to FIG. 11 showing an argument being assigned to a pattern parameter using a drag and drop operation.
Figure 13:
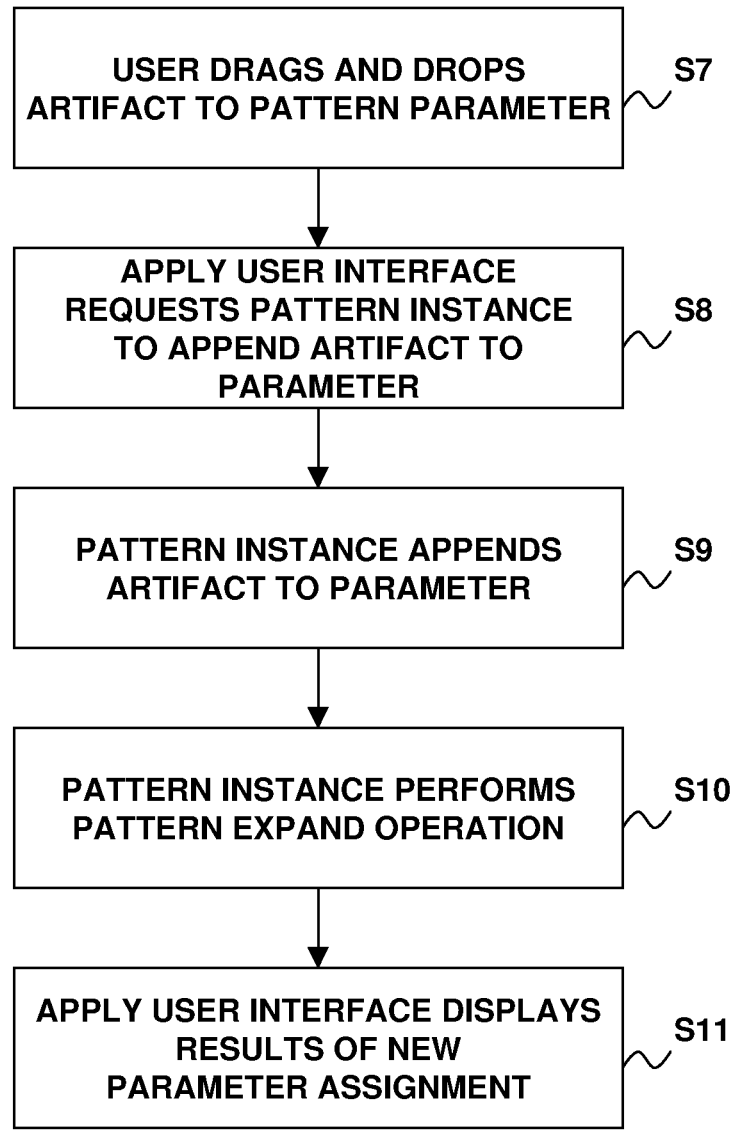
FIG. 13 is a flow diagram showing exemplary steps for implementing the drag and drop operation of FIG. 12.
Figure 14:
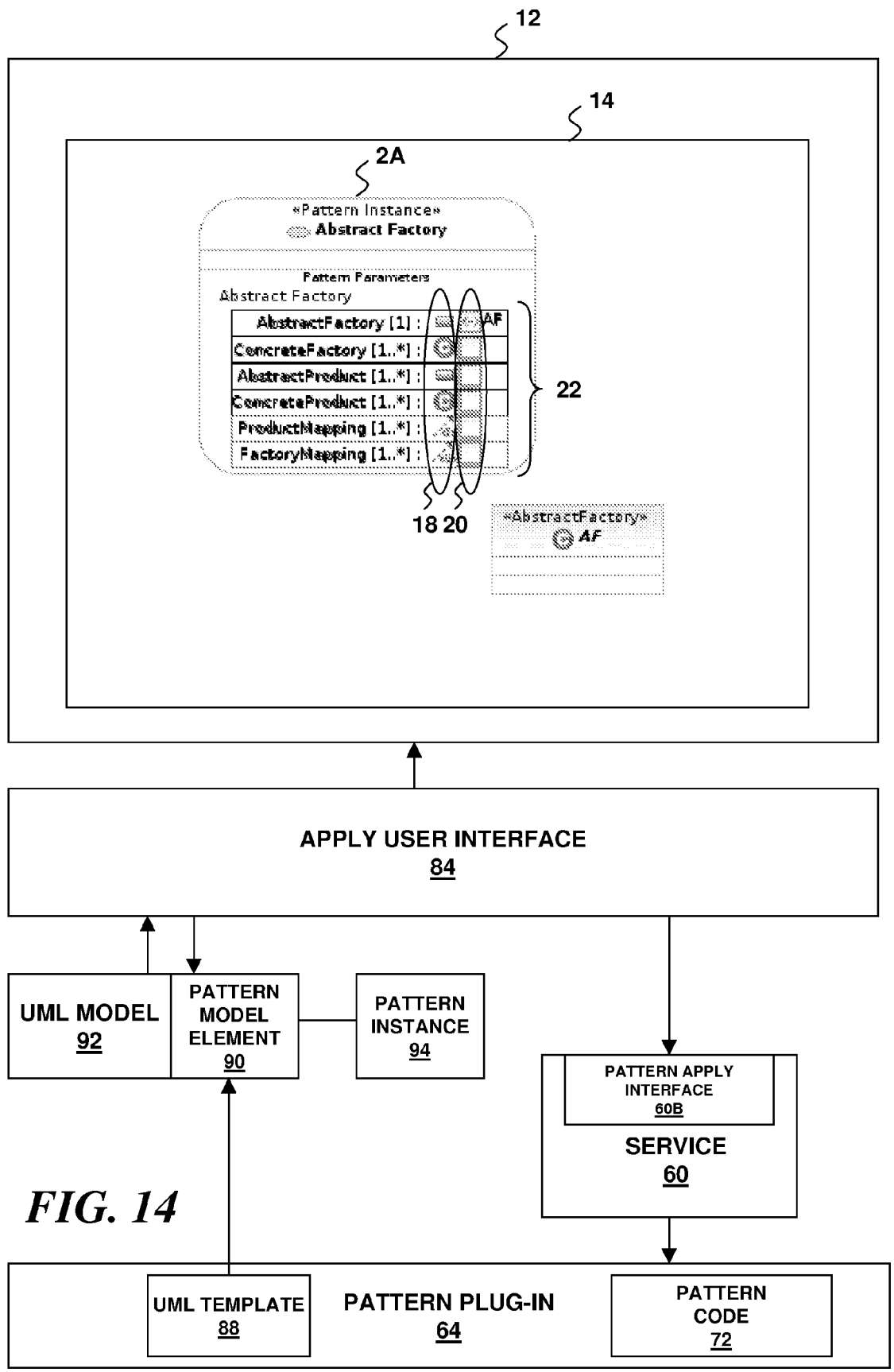
FIG. 14 is a view according to FIG. 11 showing the results of the drag and drop operation of FIG. 12.

Interactive pattern application can be achieved using different user interface techniques. One such technique employs a drag and drop gesture in which the graphical representation of an artifact in the diagram 14 is dragged to a particular parameter and dropped on it. This technique is illustrated in FIG. 12, wherein the class artifact labeled "AF" is shown being dragged and dropped onto the "AbstractFactory" parameter in the pattern representation 2A. FIG. 13 illustrates a sequence of exemplary steps that may be performed to implement this expansion operation. In step S7, the pattern user drags and drops the argument onto the pattern parameter. In step S8, the apply user interface 84 requests the pattern instance 94 to append the artifact to the given parameter's list of arguments. In step S9, the pattern instance 94 appends the artifact to the parameter. In step S10, the pattern instance 94 performs a pattern expand operation to update the UML model 92 to reflect the addition of the new artifact. In step S11, the apply user interface graphically displays the results of the new parameter assignment and expand operation, thereby providing feedback to the pattern user. This updated view is shown in FIG. 14, which shows the result of the bind operation wherein the AF class artifact is now bound as an argument for the AbstractFactory parameter, as reflected by the insertion of the AF identifier in the compartment space 22 for this parameter and the modification of the binding icon 20 immediately to the left of the compartment space. It will also be seen that the "AbstractFactory" keyword has been added to the AF class artifact. Although not shown, the apply user interface 84 can be configured to provide feedback to the pattern user during the drag operation to indicate valid (and invalid) drop targets for the artifact being dragged. An attempt to drop an invalid artifact will result in an appropriate symbol being displayed (such as circle-and-slash symbol) to alert the pattern user. Such a symbol could be displayed, for example, if the pattern user attempted to drag and drop an artifact that was not a class artifact onto the ConcreteFactory parameter (which takes only class arguments as shown by the parameter type icon 18).

Figure 15:
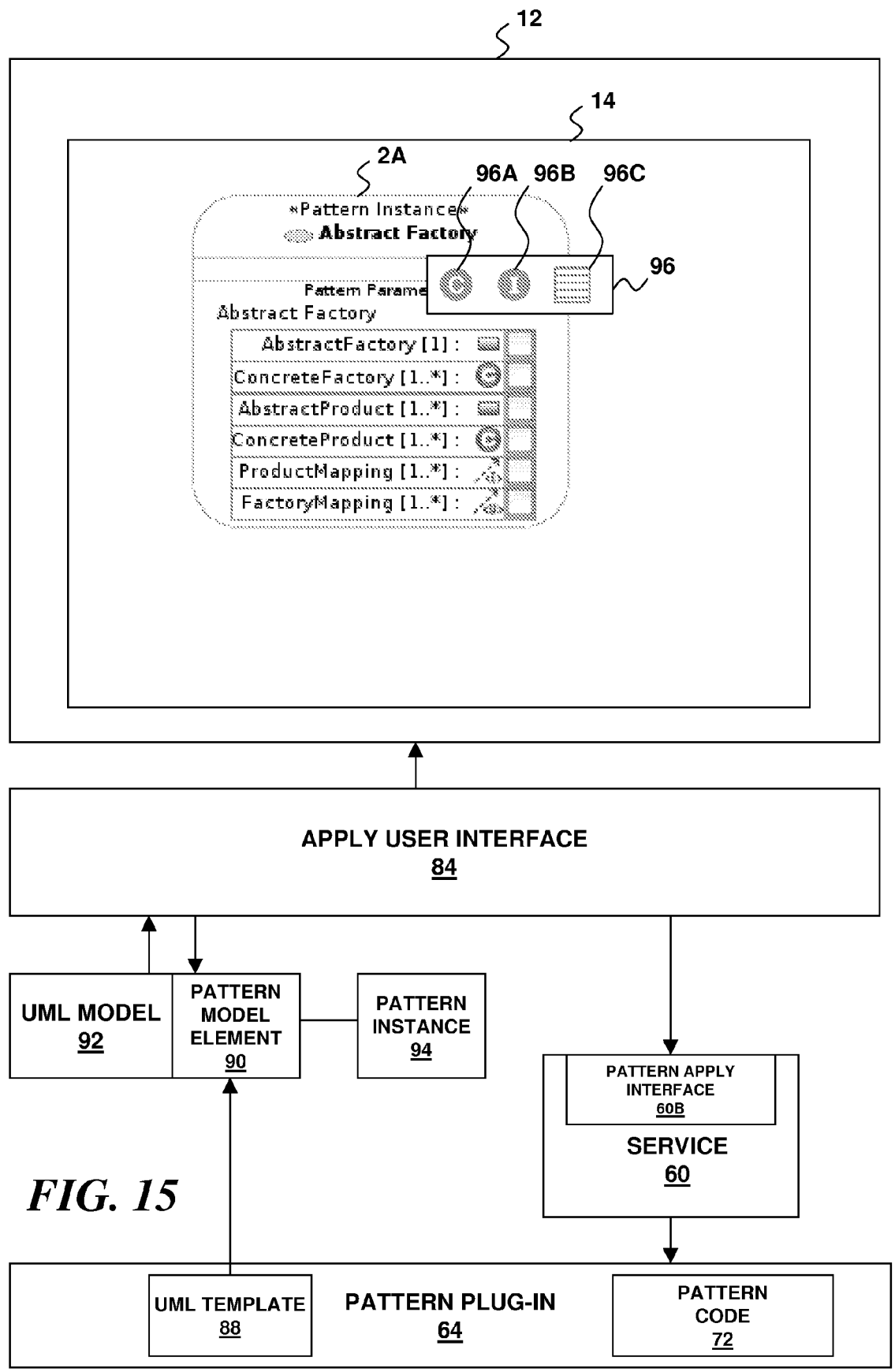
FIG. 15 is a view according to FIG. 11 showing an argument being assigned to a pattern parameter using an action bar.

Turning now to FIG. 15, in addition to supporting a bind operation via drag and drop gestures, an action bar 96 is also available to bind existing artifacts to pattern parameters and also facilitate the creation of new objects that are then bound to the parameter. In FIG. 15, the action bar 96 is shown hovering just above the AbstractFactory parameter as a result of the pattern user moving a mouse cursor over that parameter. In the example of FIG. 15, there are three icons in the action bar 96. A first icon 96A indicates that this parameter allows for the creation/binding of a class artifact. A second icon 96B indicates that this parameter allows for the creation/binding of an interface artifact. A third icon 96C indicates a text entry action that allows the pattern user to type in the name of either a new artifact or an artifact that already exists in the UML model 92. Selecting either of the class or interface icons 96A or 96B will result in the creation of an artifact that is uniquely named and bound to the parameter. Selection of the text entry action icon 96C will result in the display of a text entry field where the user will be allowed to type in the name of a new or existing artifact. Upon successful completion of the entry, the artifact that is mapped to the name will be bound to the parameter.

Figure 16:
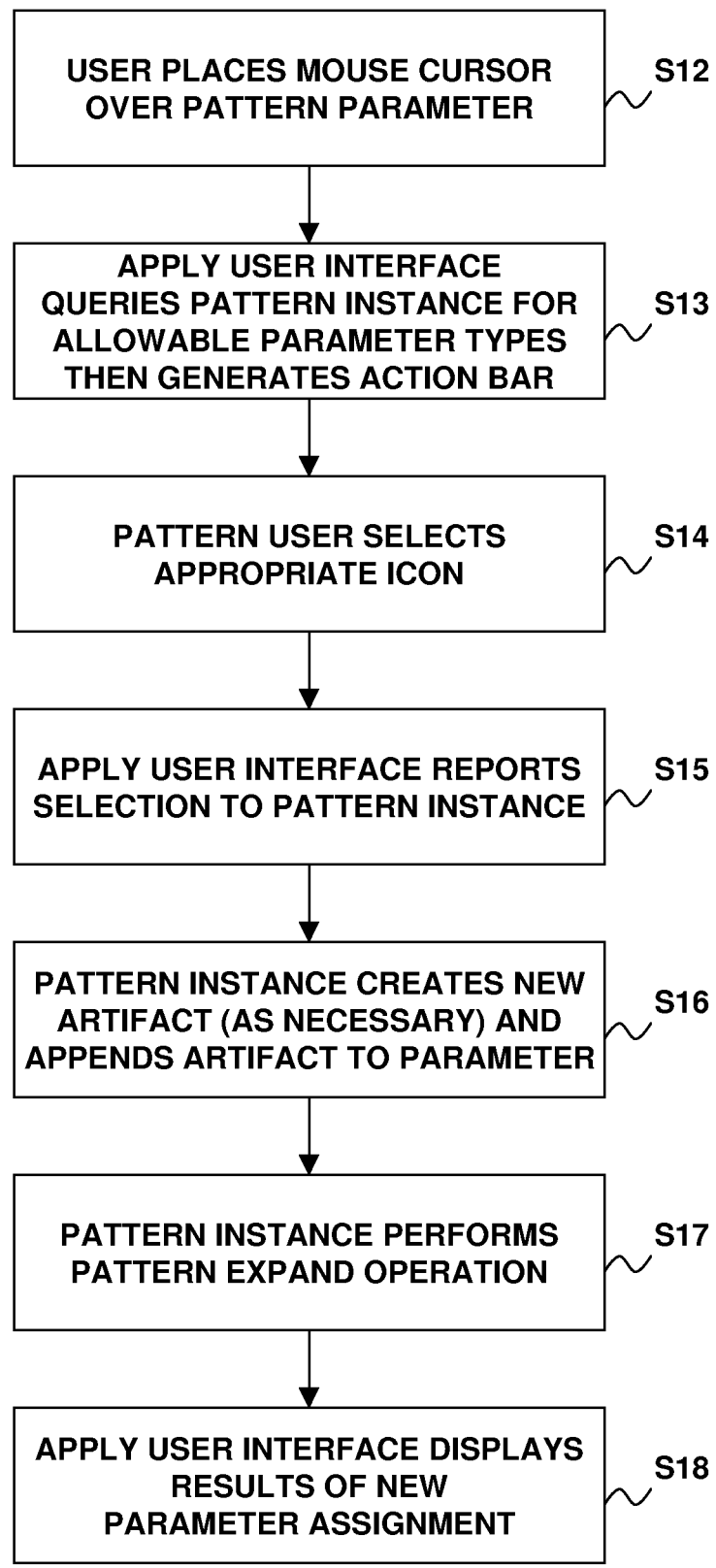
FIG. 16 is a flow diagram showing exemplary steps for implementing the action bar operation of FIG. 15.

FIG. 16 illustrates an exemplary sequence of steps that may be performed by the apply user interface 84 to implement this expansion operation. In step S12, the pattern user places a mouse cursor over the desired pattern parameter. In step S13, the apply user interface 84 queries the pattern instance 94 for a list of allowable parameter types, then generates the action bar 96 containing an icon for each allowable type. In step S14, the pattern user selects the appropriate icon. In step S15, the apply user interface reports the pattern user's selection to the pattern instance 94. In step S16, the pattern instance 94 creates a new artifact (unless the text icon 96C is selected and the user types in the name of an existing artifact) and appends the artifact to the given parameter's list of arguments. In step S17, the pattern instance performs a pattern expand operation to update the UML model 92. In step S18, the apply user interface graphically displays the results of the new parameter assignment and expand operation, thereby providing feedback to the pattern user.

Figure 17:
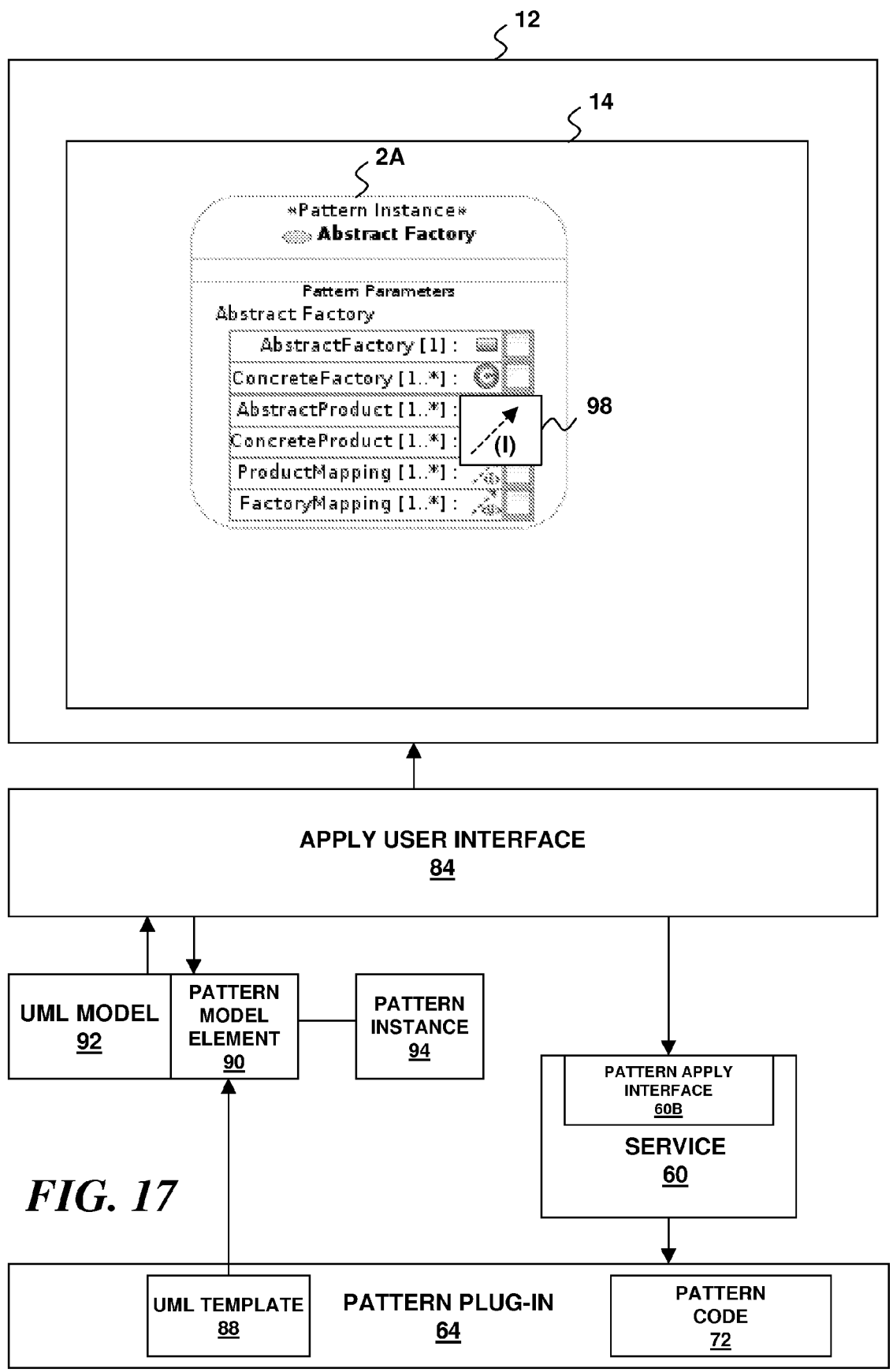
FIG. 17 is a view according to FIG. 11 showing an argument being assigned to a relationship pattern parameter using an action bar.
Figure 18:
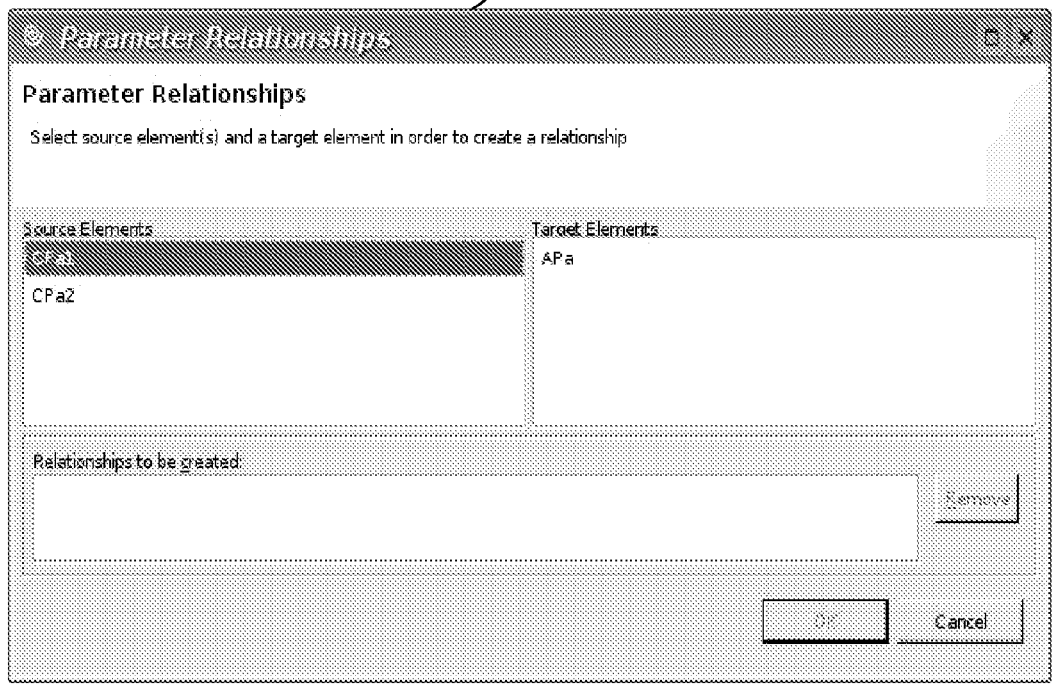
FIG. 18 is a graphical view of a dialog box for assigning arguments to a relationship pattern parameter using the action bar operation of FIG. 17.
Figure 19:
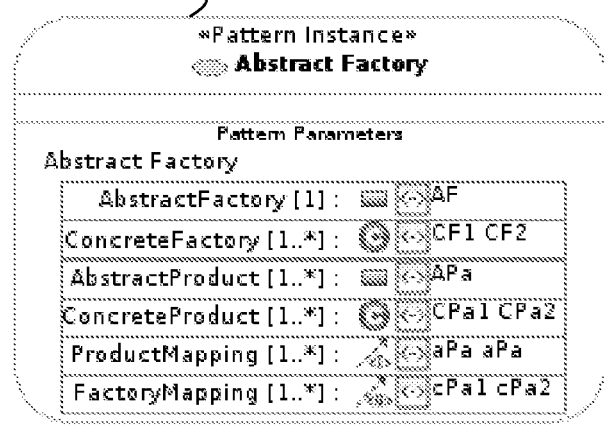
FIG. 19 is a graphical representation of an abstract factory pattern showing the result of assigning arguments to a relationship parameter using the dialog box of FIG. 18.
Figure 20:
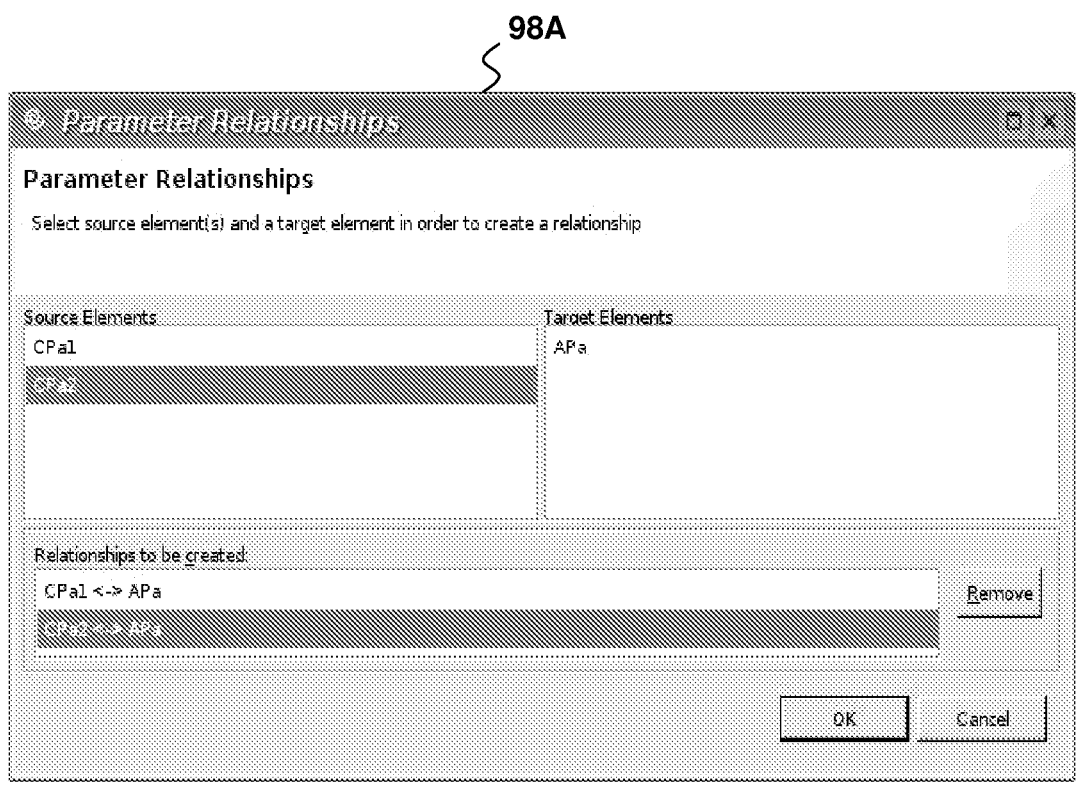
FIG. 20 is a graphical view of the dialog box of FIG. 18 following the assignment of arguments to a relationship pattern parameter.

Turning now to FIG. 17, in this example, an action bar 98 is also available to assign dependency relationships to the ProductMapping and FactoryMapping relationship parameters. In FIG. 17, the action bar 98 is shown hovering just above the ProductMapping parameter as a result of the pattern user moving a mouse cursor over that parameter. When the action bar 98 is selected, the apply user interface 84 generates the mapping dialog 98A shown in FIG. 18. The mapping dialog 98A corresponds to the pattern representation 2A in FIG. 19, in which two concrete factory artifacts CF1 and CF2 generate concrete product artifacts CPa1 and CPa2 that each extend an abstract product class APa. As earlier described, the ProductMapping parameter is concerned with mapping ConcreteProduct artifacts to AbstractProduct artifacts. The mapping dialog 98A allows the pattern user to create the required relationships by selecting a source element (e.g., CPa1 or CPa2) from the left-hand window labeled "Source Elements" and a target element from the right-hand window labeled "Target Elements." Selecting from the two lists in this way will cause a symbolic relationship graphic to be created and displayed in the lower window labeled "Relationships to be created." This is shown in FIG. 20 wherein the lower window confirms that the concrete product artifacts CPa1 and CPa2 are both related to the abstract product artifact APa. This relationship creation operation can be repeated as many times as necessary (or until all the unique combinations are exhausted). Once the relationship(s) are selected, pressing the "OK" button in the mapping dialog 98A causes the designated relationships to be created and bound to the ProductMapping parameter via calls made by the apply user interface 84 to the pattern instance 94.

Figure 21:
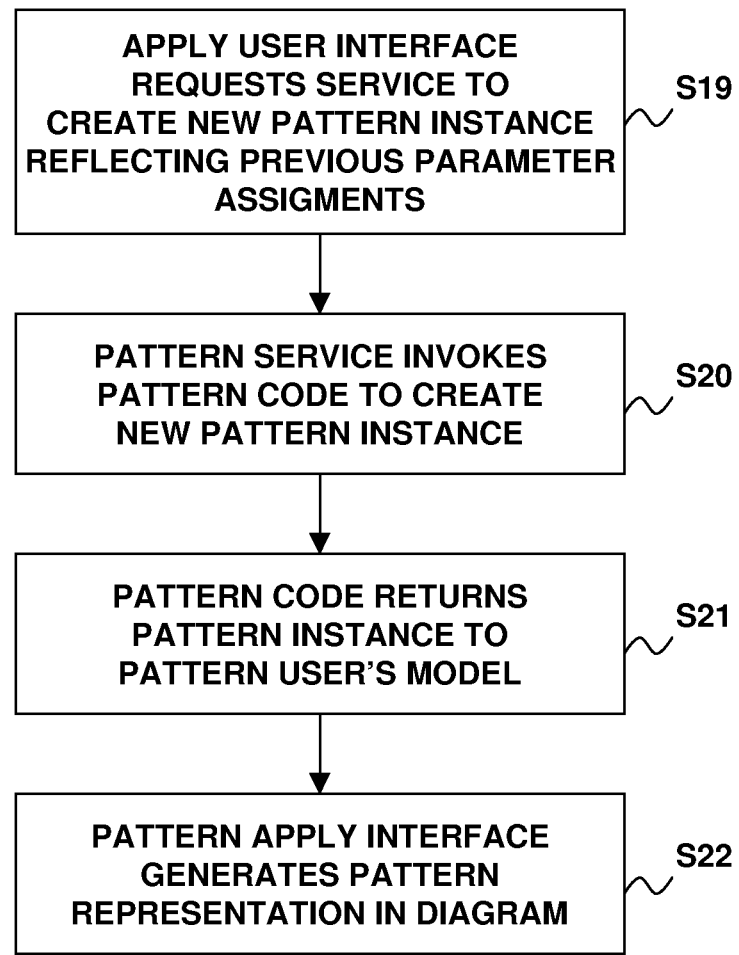
FIG. 21 is a flow diagram showing exemplary steps for reopening a saved pattern instance.

It will be appreciated that techniques similar to those used to assign arguments to pattern parameters, as described above in connection with FIGS. 12-20, may be used to undo parameter assignments in the event the pattern user makes a mistake or changes his or her mind regarding a particular assignment. Moreover, an additional pattern application feature is that patterns can be saved in a pattern user's UML model at any point during pattern expansion, and later reopened to perform additional pattern expansion. Returning briefly now to FIG. 10, pattern saving occurs periodically as pattern arguments are applied to pattern parameters by storing the pattern expansion information in the pattern user's UML model 92 as part of the pattern model element 90. When the UML model 92 is reopened, the exemplary sequence of steps shown in FIG. 21 may be performed to recreate the environment that existed prior to the save operation. In step S19, the apply user interface 84 requests the service component 60 to create a new pattern instance, but with the pattern expansion information stored in the UML model being applied to the parameters. In step S20, the service component 60 invokes the pattern code 72 to perform the required operations. In step S21, the pattern code 72 returns the new pattern instance 94 to the UML model

92. In step S22, the apply user interface 84 displays the pattern representation 2A in the diagram 14. Pattern expansion may now proceed where the pattern user left off prior to saving the UML model 92.

Figure 22:
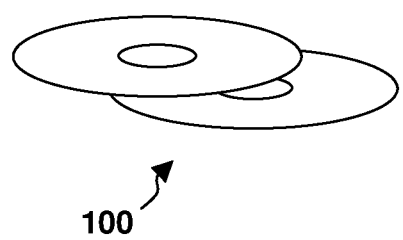
FIG. 22 is a diagrammatic representation of exemplary storage media that may be used to store a pattern implementation computer program.

Accordingly, a pattern implementation technique has now been disclosed. It will be appreciated that the inventive concepts may be variously embodied in any of a data processing system, a machine implemented method, and a computer program product in which program instructions are stored by one or more machine-usable media for use in controlling a computer or other data processing system to perform the required functions. Exemplary machine-useable data storage media for storing such program instructions are shown by reference numeral 100 in FIG. 22. The data storage media 100 are shown as being portable optical storage disks of the type that are conventionally used for commercial software sales, such as compact disk-read only memory (CD-ROM) disks, compact-disk read/write (CD-R/W) disks, and digital versatile disks (DVDs). Such data storage media can store the program instructions of the invention, either alone or in conjunction with another software product that incorporates the required functionality. The data storage media could also be provided by other portable data storage media (such as floppy disks, flash memory sticks, etc.), or data storage media combined with drive systems (e.g. disk drives), or data storage media incorporated in data processing platforms, such as random access memory (RAM), read-only memory (ROM) or other semiconductor or solid state memory. More broadly, the data storage media could comprise any electronic, magnetic, optical, infrared, semiconductor system or apparatus or device, transmission or propagation medium (such as a network), or other entity that can contain, store, communicate or transport the programming means for use by or in connection with a data processing system, computer or other instruction execution system, apparatus or device.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A pattern implementation method for a software system, comprising:
    defining a pattern as a software artifact that comprises a pattern signature representing one or more parameters of said pattern and a pattern implementation model representing one or more methods for expanding said pattern in a selected software context by assigning one or more arguments to said one or more parameters;
    initiating application of said pattern by creating an instance of said pattern in said software context;
    creating a graphical pattern template representation of said pattern instance within a graphical representation of said software context, said pattern template representation comprising a window that displays a name of said pattern and contains a listing of said pattern parameters, said graphical template representation window being disposed in a parent window that provides said graphical representation of said software context;
    said pattern template representation providing a user interface that allows a pattern user to apply arguments to and remove arguments from said pattern parameters and to modify said software context according to said arguments being added and removed; and
    said user interface being operable to support iterative application of said arguments to said pattern parameters and removal of said arguments from said pattern parameters while modifying said software context as each said argument application and removal is performed, said modifying of said software context resulting in changes to said graphical representation of said software context in said parent window to provide sequential and cumulative user feedback so that a user can visually track the effects of pattern application in said graphical representation of said software context as said arguments are applied to or removed from said pattern parameters in said graphical representation of said pattern instance that is in said graphical representation of said software context.

2. A method in accordance with claim 1, wherein each pattern parameter in said listing of pattern parameters includes a parameter name and associated text and non-text graphical elements for indicating additional information about said pattern parameter.

3. A method in accordance with claim 2, wherein one or more of said pattern parameters in said listing of pattern parameters comprises a user interface entity for binding a software entity of said software context as one of said arguments to said pattern parameter.

4. A method in accordance with claim 3, wherein said user interface entity is selectively operable to bind an existing software entity or to create and bind a new software entity.

5. A method in accordance with claim 3, wherein said user interface entity supports binding a software entity using each of (1) a drag-and-drop action in which an artifact representing an existing software entity in said graphical representation of said software context is dragged and dropped on said pattern parameter interface entity, (2) an icon select action in which a software entity is created and bound as a pattern parameter argument in response to selection of an icon associated with said pattern parameter interface entity, and (3) a text box entry action in which a new or existing software entity is specified in a text box associated with said pattern parameter interface entity.

6. A method in accordance with claim 3, wherein said user interface entity supports a mapping interface action that creates a dependency relationship between software entities in said software context.

7. A method in accordance with claim 2, wherein said text and non-text graphical elements associated with said parameters in said listing of parameters include each of (1) a multiplicity designator indicating the number of software entities that may be bound to said parameter, (2) a parameter type designator indicating the type of software entity that may be bound to said parameter, (3) a bound state designator indicating a binding state of said parameter, and (4) a compartment space that identifies each software entity that is bound as an argument to said pattern parameter.

8. A pattern implementation system, comprising:
    a data processing hardware platform that includes a display device;
    program instructions executable on said data processing platform to perform pattern implementation operations, said operations comprising:
    defining a pattern as a software artifact that comprises a pattern signature representing one or more parameters of said pattern and a pattern implementation model representing one or more methods for expanding said pattern in a selected software context by assigning one or more arguments to said one or more parameters;
    initiating application of said pattern by creating an instance of said pattern in said software context;

creating a graphical pattern template representation of said pattern instance within a graphical representation of said software context, said pattern template representation comprising a window in said display device that displays a name of said pattern and contains a listing of said pattern parameters, said graphical template representation window being disposed in a parent window that provides said graphical representation of said software context;

said pattern template representation providing a user interface that allows a pattern user to apply arguments to and remove arguments from said pattern parameters and to modify said software context according to said arguments being added and removed; and said user interface being operable to support iterative application of said arguments to said pattern parameters and removal of said arguments from said pattern parameters while modifying said software context as each said argument application and removal is performed, said modifying of said software context resulting in changes to said graphical representation of said software context in said parent window to provide sequential and cumulative user feedback so that a user can visually track the effects of pattern application in said graphical representation of said software context as said arguments are applied to or removed from said pattern parameters in said graphical representation of said pattern instance that is in said graphical representation of said software context.

9. A system in accordance with claim 8, wherein each pattern parameter in said listing of pattern parameters includes a parameter name and associated text and non-text graphical elements for indicating additional information about said pattern parameter.

10. A system in accordance with claim 9, wherein one or more of said pattern parameters in said listing of pattern parameters comprises a user interface entity for binding a software entity of said software context as one of said arguments to said pattern parameter.

11. A system in accordance with claim 10, wherein said user interface entity is selectively operable to bind an existing software entity or to create and bind a new software entity.

12. A system in accordance with claim 10, wherein said user interface entity supports binding a software entity using each of (1) a drag-and-drop action in which an artifact representing an existing software entity in said graphical representation of said software context is dragged and dropped on said pattern parameter interface entity, (2) an icon select action in which a software entity is created and bound as a pattern parameter argument in response to selection of an icon associated with said pattern parameter interface entity, and (3) a text box entry action in which a new or existing software entity is specified in a text box associated with said pattern parameter interface entity.

13. A system in accordance with claim 10, wherein said user interface entity supports a mapping interface action that creates a dependency relationship between software entities in said software context.

14. A system in accordance with claim 9, wherein said text and non-text graphical elements associated with said parameters in said listing of parameters include each of (1) a multiplicity designator indicating the number of software entities that may be bound to said parameter, (2) a parameter type designator indicating the type of software entity that may be bound to said parameter, (3) a bound state designator indicating a binding state of said parameter, and (4) a compartment space that identifies each software entity that is bound as an argument to said pattern parameter.

15. A computer program product, comprising:
one or more machine-usable non-transitory data storage media;
program instructions stored on said data storage media for programming a data processing hardware platform to perform pattern implementation operations, said operations comprising:
defining a pattern as a software artifact that comprises a pattern signature representing one or more parameters of said pattern and a pattern implementation model representing one or more methods for expanding said pattern in a selected software context by assigning one or more arguments to said one or more parameters;
initiating application of said pattern by creating an instance of said pattern in said software context;
creating a graphical pattern template representation of said pattern instance within a graphical representation of said software context, said pattern template representation comprising a window in said display device that displays a name of said pattern and contains a listing of said pattern parameters, said graphical template representation window being disposed in a parent window that provides said graphical representation of said software context;
said pattern template representation providing a user interface that allows a pattern user to apply arguments to and remove arguments from said pattern parameters and to modify said software context according to said arguments being added and removed; and
said user interface being operable to support iterative application of said arguments to said pattern parameters and removal of said arguments from said pattern parameters while modifying said software context as each said argument application to and removal is performed, said modifying of said software context resulting in changes to said graphical representation of said software context in said parent window to provide sequential and cumulative user feedback.

16. A computer program product in accordance with claim 15, wherein each pattern parameter in said listing of pattern parameters includes a parameter name and associated text and non-text graphical elements for indicating additional information about said pattern parameter.

17. A computer program product in accordance with claim 16, wherein one or more of said pattern parameters in said listing of pattern parameters comprises a user interface entity for binding a software entity of said software context as one of said arguments to said pattern parameter.

18. A computer program product in accordance with claim 17, wherein said user interface entity is selectively operable to bind an existing software entity or to create and bind a new software entity.

19. A computer program product in accordance with claim 17, wherein said user interface entity supports binding a software entity using each of (1) a drag-and-drop action in which an artifact representing an existing software entity in said graphical representation of said software context is dragged and dropped on said pattern parameter interface entity, (2) an icon select action in which a software entity is created and bound as a pattern parameter argument in response to selection of an icon associated with said pattern parameter interface entity, and (3) a text box entry action in which a new or existing software entity is specified in a text box associated with said pattern parameter interface entity.

20. A computer program product in accordance with claim 17, wherein said user interface entity supports a mapping interface action that creates a dependency relationship between software entities in said software context.

21. A computer program product in accordance with claim 16, wherein said text and non-text graphical elements associated with said parameters in said listing of parameters include each of (1) a multiplicity designator indicating the number of software entities that may be bound to said parameter, (2) a parameter type designator indicating the type of software entity that may be bound to said parameter, (3) a bound state designator indicating a binding state of said parameter, and (4) a compartment space that identifies each software entity that is bound as an argument to said pattern parameter.

\* \* \* \* \*